(12) United States Patent
Abe et al.

(10) Patent No.: US 9,552,134 B2
(45) Date of Patent: *Jan. 24, 2017

(54) POINTER CONTROLLING APPARATUS, METHOD THEREOF, AND POINTER CONTROLLING PROGRAM TO PREVENT ERRONEOUS OPERATION

(71) Applicant: GVBB HOLDINGS S.A.R.L., Luxembourg (LU)

(72) Inventors: Koichi Abe, Tokyo (JP); Shogo Tsubouchi, Tokyo (JP)

(73) Assignee: GVBB Holdings S.A.R.L., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/967,101

(22) Filed: Dec. 11, 2015

(65) Prior Publication Data
US 2016/0103582 A1     Apr. 14, 2016

Related U.S. Application Data

(63) Continuation of application No. 12/735,475, filed as application No. PCT/JP2008/000117 on Jan. 30, 2008, now Pat. No. 9,244,587.

(51) Int. Cl.
*G06F 3/0481*       (2013.01)

(52) U.S. Cl.
CPC ......... *G06F 3/04812* (2013.01); *G06F 3/0481* (2013.01)

(58) Field of Classification Search
CPC .......... G06F 3/03; G06F 3/033; G06F 3/0354; G06F 3/038; G06F 3/0416; G06F 3/048; G06F 3/0481; G06F 3/04812; G06F 3/04817; G06F 3/0482; G06F 3/0484; G06F 3/04842
See application file for complete search history.

(56) References Cited

U.S. PATENT DOCUMENTS 5,703,620 A    12/1997 Keyson
5,786,805 A     7/1998 Barry
(Continued)

FOREIGN PATENT DOCUMENTS

CN          10198545 A       7/1998

OTHER PUBLICATIONS

International Preliminary Report on Patentability dated Aug. 3, 2010 and Written Opinion dated Nov. 17, 2009 regarding PCT Application No. PCT/JP2008/000117.
(Continued)

*Primary Examiner* — Keith Crawley
(74) *Attorney, Agent, or Firm* — Arent Fox LLP

(57) ABSTRACT

A pointer controlling apparatus, a control method, and a pointer controlling program are provided which can protect a button from erroneous operation without interrupting the operational flow or using excessive display area. The pointer controlling apparatus permits a pointer to move into a predetermined region after a predetermined period of time has elapsed from a point in time when the pointer comes into contact with a boundary line of the predetermined region. Accordingly, the predetermined area can be securely protected from a point in time at which the pointer comes into contact with the boundary line of the predetermined region for the predetermined amount of time. Furthermore, since the pointer is permitted to enter the predetermined region immediately after the predetermined time has elapsed, the predetermined region can be protected without interrupting the operational flow, and without using an excess of a display region.

37 Claims, 17 Drawing Sheets

(56) References Cited

U.S. PATENT DOCUMENTS

| | | | |
|---|---|---|---|
| 5,808,601 A | 9/1998 | Leah et al. | |
| 5,870,079 A | 2/1999 | Hennessy | |
| 5,929,840 A * | 7/1999 | Brewer | G06F 3/04812 345/157 |
| 5,963,191 A | 10/1999 | Jaaskelainen, Jr. | |
| 6,295,049 B1 | 9/2001 | Minner | |
| 6,486,869 B1 | 11/2002 | Nakano | |
| 6,867,790 B1 * | 3/2005 | Brooks | G06F 3/04812 345/157 |
| 7,404,149 B2 | 7/2008 | Fox et al. | |
| 8,482,521 B2 | 7/2013 | Abe | |
| 2001/0010513 A1 | 8/2001 | Rosenberg et al. | |
| 2001/0016858 A1 | 8/2001 | Bates | |
| 2002/0003529 A1 | 1/2002 | Takase et al. | |
| 2004/0135824 A1 | 7/2004 | Fitzmaurice | |
| 2005/0088410 A1 | 4/2005 | Chaudhri | |
| 2005/0166162 A1 | 7/2005 | Kaneko | |
| 2005/0240877 A1 | 10/2005 | Baudisch et al. | |
| 2009/0015550 A1 | 1/2009 | Koski | |
| 2009/0031257 A1 | 1/2009 | Arneson | |

OTHER PUBLICATIONS

Second Office Action dated Dec. 27, 2012 regarding China Application No. CN200880128362.1.
System Pointer Family, IBM Technical Disclosure Bulletin, vol. 37, No. 3. New York. New York, Mar. 1, 1994. pp. 607-608.
Search Report Dated Nov. 17, 2009.
Office Action in Chinese Patent Application No. 2008801283621 issued Jun. 5, 2012.

* cited by examiner

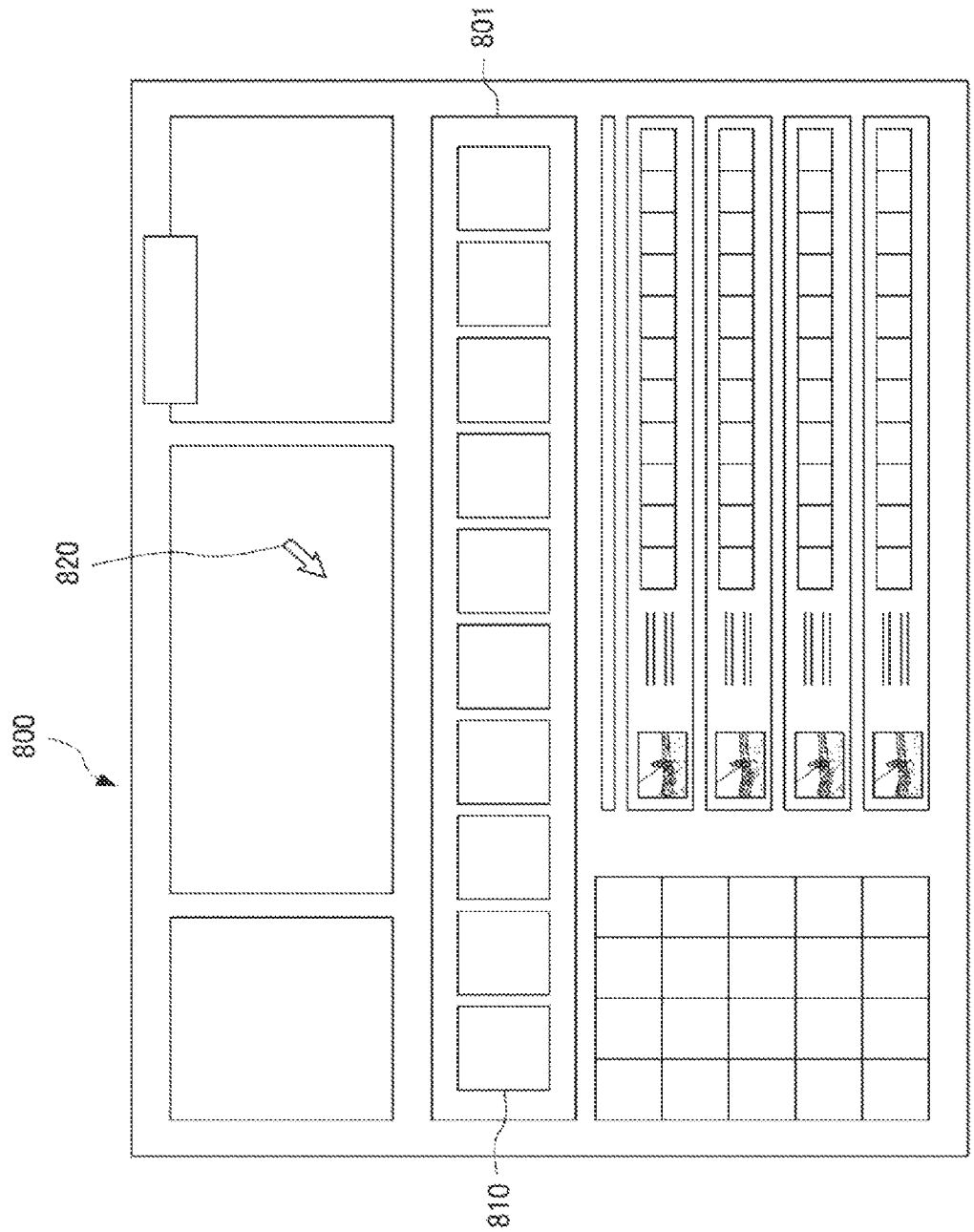

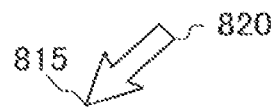
FIG. 10A
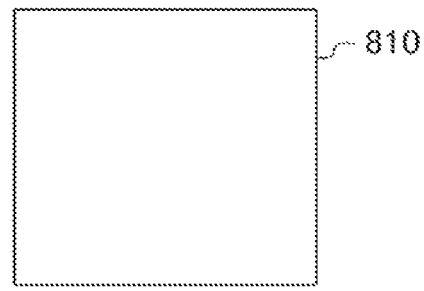
FIG. 10B
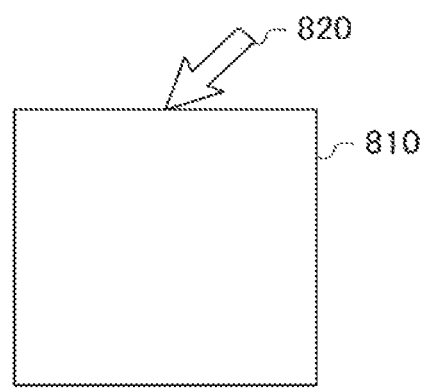
FIG. 10C
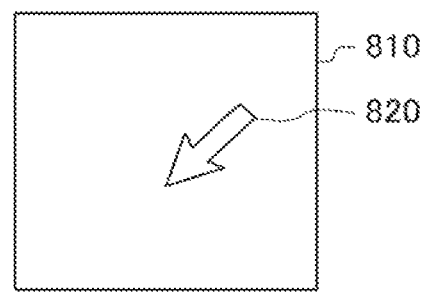

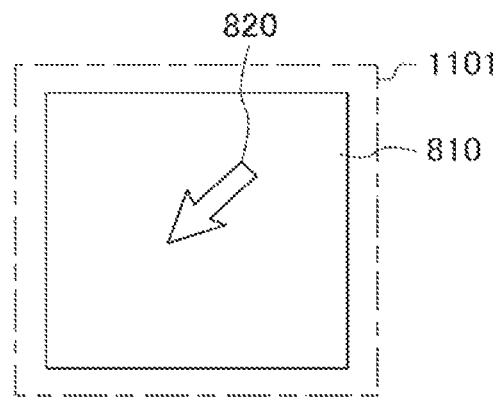
FIG. 11D
FIG. 12
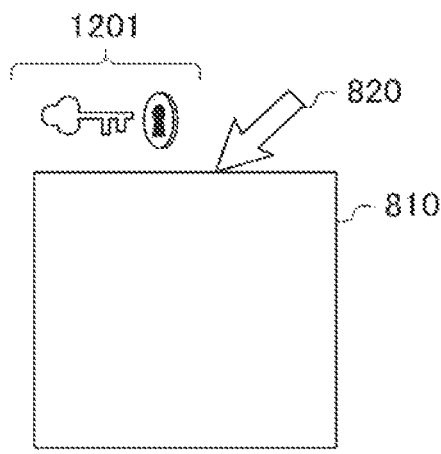
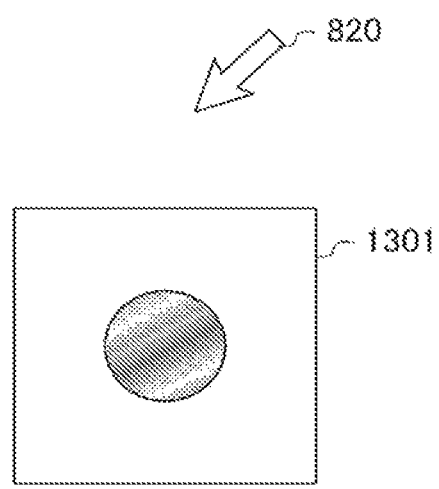
FIG. 13A

FIG. 15
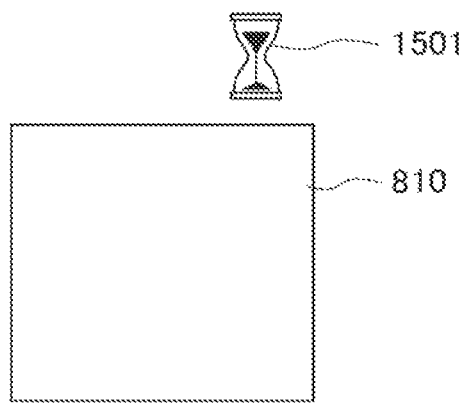
FIG. 16
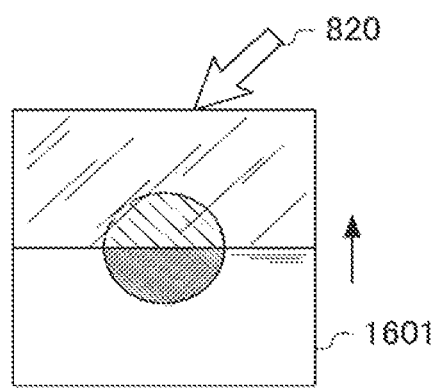
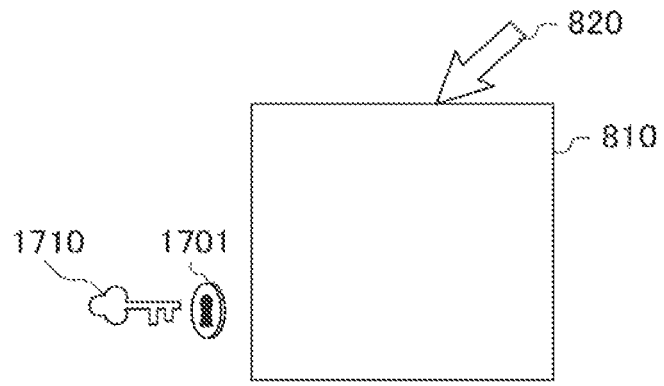
FIG. 17A

POINTER CONTROLLING APPARATUS, METHOD THEREOF, AND POINTER CONTROLLING PROGRAM TO PREVENT ERRONEOUS OPERATION

CROSS-REFERENCE TO RELATED APPLICATIONS

This application is a continuation of, and claims priority to U.S. Nonprovisional patent application Ser. No. 12/735,475 entitled "POINTER CONTROLLING APPARATUS, METHOD THEREOF, AND POINTER CONTROLLING PROGRAM TO PREVENT ERRONEOUS OPERATION" filed Jul. 20, 2010, which is a National Stage Entry of PCT/JP2008/000117 entitled "POINTER CONTROLLING APPARATUS, METHOD THEREOF, AND POINTER CONTROLLING PROGRAM" filed Jan. 30, 2008, the entire contents of all of the aforementioned applications are herein incorporated by reference.

TECHNICAL FIELD

The present invention relates to a pointer controlling apparatus, a controlling method, and a pointer controlling program, such as a pointer controlling apparatus, a controlling method, and a pointer controlling program for operating a pointer displayed on the screen of a Graphical User Interface (GUI), utilizing a pointing device such as a mouse, or the like.

BACKGROUND ART

Conventionally, in a graphical user interface, hereinafter simply referred to as "GUI", utilizing a pointing device such as a mouse to operate a pointer in a GUI display screen to select a button region or a slide bar region and execute functions associated with the afore mentioned region is widely practiced. In a GUI such as that described above, in order to prevent erroneous operation by the user, a method is known in which a dialog box is displayed to obtain user confirmation when a button that should be protected has been pushed. However, in the method in which a dialog box is displayed to obtain confirmation from the user, the dialog box is displayed in response to the user operation of the button, and because the user is requested to select "Yes", "No", or "Cancel" as a response to the message shown in the dialog box, the operational flow tends to be interrupted. Furthermore, since space on the display area is required to display the dialog box, and when there is not ample space on the display area, there are cases in which the buttons that should be operated are covered and thereby hidden by the dialog box.

A method for preventing erroneous operations by the user by changing the display characteristics of the display of the region so as to enable the user to discriminate whether or not it is possible to execute the function associated with the the aforementioned region is described in Patent Reference No. 1.

Patent Citation 1: Japanese Unexamined Patent Application, First Publication No. H10-198545

DISCLOSURE OF INVENTION

Problems to be Solved by the Invention

However, in a case where real-time performance is required in operations by a GUI such as, for example, in the case of a GUI for operating an editing device used in carrying out a live relay of a sports event, since it is desirable that the menu not be displayed in a hierarchical format and that the functions associated with the respective menu items are instead assigned to buttons arranged on the screen for immediate operation, a plurality of buttons are arranged on the screen and occupy a region on the screen that has many functions associated with it. Accordingly, the possibility that an erroneous operation of the buttons will occur is increased. Furthermore, in a live relay, due to the need to maintain the quality of the real-time transmission of the events unfolding at any given moment, there are many operations which cannot be performed again, and thus it becomes necessary for buttons that should not be erroneously operated to be securely protected.

However, in Patent Reference No. 1, because the buttons are always available to be operated by the user, a method is not disclosed for solving the above-described problems.

In consideration thereof, it is an object of the present invention to provide a pointer controlling apparatus, a control method, and a pointer controlling program which can prevent erroneous user operation of buttons displayed on the screen of a GUI without interrupting the operational flow or using an excessive amount of the display area.

Means for Solving the Problem

In accordance with a first aspect of the present invention, a pointer controlling apparatus includes: a controlling means for permitting a pointer to advance into a predetermined region with a restriction when the pointer attempts to advance into the predetermined region from a region outside the predetermined region, in which the controlling means permits the pointer to move into the predetermined region after a predetermined period of time has elapsed from a point in time when the pointer comes into contact with a boundary line of the predetermined region. Furthermore, a pointer controlling apparatus, in which, in a case where the pointer leaves the predetermined region before the predetermined period of time has elapsed after having come into contact with the boundary line of the predetermined region, the controlling means stops a measurement of the predetermined period of time and sets a value so far measured to zero, is provided. Furthermore, a pointer controlling apparatus, in which, in a case where the pointer leaves a peripheral region containing the predetermined region before the predetermined period of time has elapsed after having come into contact with the boundary line of the predetermined region, the controlling means stops the measurement of the predetermined period of time and sets a value thus far measured to be zero (0), is provided.

In accordance with the present invention, the pointer is permitted to advance into the predetermined region after a predetermined period of time has elapsed from a point in time when the pointer comes into contact with the boundary line of the predetermined region. Accordingly, the predetermined region can be securely protected against erroneous operation by the pointer from the point in time at which the pointer comes into contact with the boundary line of the predetermined region until a predetermined amount of time has elapsed. Furthermore, the pointer is permitted to enter the predetermined region immediately after the predetermined time has elapsed. Accordingly, it becomes possible to provide a pointer controlling apparatus that protects the predetermined region against erroneous operation by the pointer without interrupting the operational flow, and without using an excessively large amount of a display region.

Furthermore, in a case where the pointer leaves the predetermined region before the predetermined period of time has elapsed after having come into contact with the boundary line of the predetermined region, a measurement of the predetermined period of time may be stopped and a value thus far measured may be set to zero. Accordingly, the predetermined area can be securely protected for the predetermined period of time. Furthermore, in a case where the pointer leaves a peripheral region containing the predetermined region before the predetermined period of time has elapsed after having come into contact with the boundary line of the predetermined region, the measurement of the predetermined period of time may be stopped and a value thus far measured may be set to zero (0). Accordingly, the pointer can be moved between the predetermined region and the peripheral region containing the predetermined region while the predetermined period of time is being measured, and the measurement is thus prevented from being reset due to unintentional operation.

Furthermore, according to the present invention, the pointer controlling apparatus may permit the pointer to move into the predetermined region after a predetermined period of time has elapsed from a point in time when the pointer comes into contact with the region containing the predetermined region. Accordingly, the predetermined region can be securely protected against erroneous operation by the pointer from the point in time at which the pointer comes into contact with the region containing the predetermined region until the predetermined amount of time has elapsed. Furthermore, the pointer is permitted to enter the predetermined region immediately after the predetermined period of time has elapsed. Accordingly, it becomes possible to provide a pointer controlling apparatus that protects the predetermined region against erroneous operation by the pointer without interrupting the operational flow, and without using an excessively large amount of a display region. Moreover, the pointer can be moved between the predetermined region and the peripheral region containing the predetermined region while the predetermined period of time is being measured, and the measurement is thus prevented from being reset due to unintentional operation.

Furthermore, according to the present invention, the pointer controlling apparatus may have a notification means to provide a notification to a user that the pointer has come into contact with the predetermined region, and permit the pointer to move into the predetermined region in accordance with a command inputted by a user operating a command inputting means. Accordingly, pointer controlling apparatus according to the present invention can securely provide a notification that the pointer has come contact with the predetermined region using the notification means and protect the predetermined region predetermined region against erroneous operation by the pointer until the user inputs the command operating the command inputting means. Furthermore, the pointer controlling means provides the notification using the notification means and the pointer is permitted to enter the predetermined region immediately after the user inputs the command operating the command inputting means. Accordingly, the predetermined region can be protected against erroneous operation by the pointer without interrupting the operational flow, and without using an excess of a display region.

Furthermore, according to the present invention, the pointer controlling apparatus may provide a notification to the user at a point in time when that the pointer comes in contact with the predetermined region using the notification means, and the pointer may be permitted to advance into the predetermined region after a predetermined period of time has elapsed from a point in time when the notification was provided by the notification means. Accordingly, the predetermined region can be securely protected against erroneous operation in a user-friendly manner from the point in time that the notifying means notifies the user that the pointer comes into contact with the boundary line of the predetermined region until a predetermined period of time has elapsed. Furthermore, the pointer is permitted to enter the predetermined region immediately after the predetermined time has elapsed. Accordingly, the predetermined region can be protected against erroneous operation by the pointer without interrupting the operational flow, and without using an excessive of a display region.

According to another aspect of the present invention, a pointer controlling method includes: a step of permitting a pointer to advance into a predetermined region with a restriction when the pointer attempts to move into the predetermined region from a region outside the predetermined region, in which the step includes a step of permitting the pointer to move into the predetermined region after a predetermined period of time has elapsed from a point in time when the pointer comes into contact with a boundary line of the predetermined region.

According to the present invention, the pointer is permitted to move into the predetermined region after a predetermined period of time has elapsed from a point in time when the pointer comes into contact with the boundary line of the predetermined region. Accordingly, the predetermined region can be securely protected against erroneous operation by the pointer from the point in time at which the pointer comes into contact with the boundary line of the predetermined region until a predetermined amount of time has elapsed. Furthermore, the pointer is permitted to enter the predetermined region immediately after the predetermined time has elapsed. Accordingly, the predetermined region can be protected against erroneous operation by the pointer without interrupting the operational flow, and without using an excess of a display region.

In accordance with yet another aspect of the present invention, there is provided a pointer controlling program executable by a computer to implement a step of permitting a pointer to move into a predetermined region with a restriction when the pointer attempts to move into the predetermined region from a region outside the predetermined region, in which the step includes a step of permitting the pointer to move into the predetermined region after a predetermined period of time has elapsed from a point in time when the pointer comes into contact with the boundary line of the predetermined region.

The present invention can provide a pointer controlling apparatus, a control method, and a pointer controlling program which can prevent erroneous operation of buttons displayed on the screen of a graphical user interface without interrupting the operational flow or using excessive amount of the display area.

DETAILED DESCRIPTION

Preferred embodiments of the present invention are described below with reference to the accompanying drawings.

FIG. 1 is a schematic block diagram showing an overview of an information processing system including an embodiment of a pointer controlling apparatus according to the present invention. As shown in FIG. 1, the information processing system 100 is provided with an image server 101, a controller 111, a keyboard 112, a mouse 113, cameras 121 to 123, camera monitors 131 to 133, a decoder monitor 134, a system monitor 135, and the like. Each of the components forming the information processing system 100 is connected using, for example, a LAN (Local Area Network) 141 to connect the image server 100 and the controller 111, a coaxial cable 124 to connect the image server 101 and the cameras 121 to 123, a coaxial cable 136 to connect the image server 101 and the camera monitors 131 to 133, a cable 138 connect the image server 101 and the decoder monitor 134, a cable 137 to connect the controller 111 and the system monitor 1355, etc. However, the method of connection is not limited thereto, and may include any other wired or wireless connection methods if appropriate.

Furthermore, the minimal configuration according to the present embodiment of the present invention is provided with the controller 111, either the keyboard 112 or a mouse 113 that is a pointer controlling apparatus, and the system monitor 135. It should be noted that the image server 101 may also be configured as a single unit integrating the controller 111.

The image server 101 encodes the moving image signal received from the cameras 121 to 123, and stores the encoded signal as moving data. Furthermore, the image server 101 decodes the moving image data into a moving image signal, and sends the moving image signal to the decoder monitor 134. The decoder monitor 134 displays moving images based on the moving image signal received from the image server 101. The camera monitors 131 to 133 display the moving images captured by the cameras 121 to 123. Furthermore, the image server 101 may also send the moving image signal to, for example, an output device for broadcasting. The term "moving image" herein used includes a "still image", as well.

The controller 111 sends and receives via the image server 101 and the LAN 141, and displays a user interface on the display screen (shown in FIG. 2), based on the signal sent from the image server 101 and the user input. Furthermore, the controller 111 converts user input that has been input by the mouse 113, by the keyboard 112 or by the controller 111 itself to a signal, and sends the signal to the image server 101. In addition, the controller 111 sends the signal for displaying the user interface to the system monitor 135 via the cable 137.

The cameras 121 to 123 capture images of a target subject and output the images as a moving image signal, sending the moving image signal to the image server 101 via the coaxial cable 124. The cameras 121 to 123 may take images of the same target subject from different angles, may take images from each of the imaging angles with different lens, and may be configures of a combination of normal cameras and cameras capable of high-speed photography. Furthermore, the cameras 121 to 123 may take images of a different target subject.

FIG. 2 is a perspective view of the controller 111. As shown in FIGS. 1 and 2, the controller 111 is provided with a display 210 on the upper portion thereof, button groups 220 arranged in respective arrays disposed in the central area below the display 210, a T-bar 230 operated by a user by tilting in the forward or backward direction thereof disposed in the area to the lower left below the display 210, and a jog dial 240, which is disposed in the area to the lower right below the display 210, operated by rotating horizontally.

The display 210 displays the user interface corresponding to the signal and user input sent from the image server 110. Furthermore, the display 210 may be a touch panel display capable of detecting touch operations by a user to the display screen thereof and the position of the display screen that was touched, and it may be possible to input data or request commands from the touch panel. The inputting means may be a pointing device, such as the keyboard 112, the mouse 113 or a touch-panel display; it must comprise of at least one of them in the present embodiment.

The button group 220 sends a signal to the image server 101 in response to the depression of at least one of the constituent buttons thereof by the user. The buttons may illuminate in accordance with the states of the respective functions assigned thereto.

The T-bar 230 sends a signal to the image server 101 corresponding to the degree of tilt of a forwardly or backwardly tilting operation thereof by the user, and the replay speed of moving images to be reproduced, that is to say, the moving images that are to be displayed on the decoder monitor 134, is adjusted in accordance with the degree of tilt of the T-bar 230.

The jog dial 240 sends a signal to the image server 101 corresponding to the speed of rotation or the angle thereof when the jog dial 240 has been operated by a user by being rotated horizontally. For example, if the speed of rotation is fast, the faster the speed of rotation, the faster the replay speed of the moving images (the replay speed of the moving images to be displayed on the decoder monitor 134), and if the rotation stops, the replay of the moving images is halted. Furthermore, if the jog dial 240 is rotated in the clockwise direction thereof, replay is in the forward direction, and if the jog dial 240 is rotated in the counterclockwise direction, replay is in the backward direction.

It should be noted that functions of the controller 111 may also be carried out by way of the graphical user interface displayed on the system monitor 135 with the mouse 113 or keyboard 112. The keyboard 112, mouse 113, and the system monitor 135 may be connected to the image server 101. On the other hand, if there is a controller 111, the keyboard 112, mouse 113, and the system monitor 135 are not required in the information processing system 100, and may be omitted. Furthermore, the T-bar 230 and the jog dial 240 are not required on the controller 111, and may be omitted.

FIG. 3 is a block diagram showing an overview of an information processing system including an embodiment of a pointer controlling apparatus according to the present invention. As shown in FIGS. 1, 2 and 3, the information processing system 100 is provided with an image server 101, a controller 111, a keyboard 112, a mouse 113, cameras 121 to 123, distributing devices 321 to 323, camera monitors 131 to 133, a decoder monitor 134, a system monitor 135, and the like. It should be noted that the image server 101 and the controller 111 may be provided as a single integrated unit, although they are described as separate units.

The image server 101 is provided with encoders 311 to 313, a decoder 341, a display controller 351, a hard disk controller 361, a hard disk drive 362 (hereinafter, HDD 362), a CPU 371, and a memory 381, each of which is connected to a bus via which communication therebetween is possible.

The encoders 311 to 313 encode the moving image signal sent from the distributing devices 321 to 313, and converts the signal to encoded moving image data. Furthermore, the encoders 311 to 313 may also read out and encode a moving image signal stored in the HDD 362.

The decoder 341 reads out encoded moving image data from the HDD 362, decodes the encoded moving image data and sends the moving image signal thus decoded to the display controller 352 or the like.

The HDD 362 stores programs that are to be executed by a CPU 371, and encoded moving image data sent from the encoders 311 to 313. Furthermore, the HDD 362 may be provided either within the image server 101, outside of the image server 101, or both within the image server 101 and outside of the image server 101. Moreover, for explanatory purposes, the HDD 362 is described in the present embodiment; however, the present invention is not limited thereto. So long as it is capable of storing moving image data or moving image signals, any memory device, for example, a tape drive, an optical disk drive, a large volume semiconductor memory, or any combination thereof, may be used.

The CPU 371 reads out programs stored in the memory 381, and executes each type of processing in accordance with the programs contained therein. The programs executed by the CPU 371 include, for example, applications for editing or replaying moving image data, an OS (Operating System) for controlling each of the devices connected to the bus, and so on.

The memory 381 stores programs that have been read out from the HDD 362. The programs include, for example, applications for editing or playing back moving image data in response to input and output from the controller 111, and an OS for controlling each of the devices connected to the bus, and so on. Furthermore, the memory 381 may store the moving image signals and data from the devices connected to the bus.

The decoder monitor 134 is connected to the display controller 351, and displays moving images based on the moving image signal, such as a VGA signal, sent from the display controller 351. The decoder monitor 134 is used when the content of the moving image signal is to be monitored; however, it is not necessarily required in the configuration of the image processing system 100.

Furthermore, the controller 111 is provided with a controller controlling portion 391, a display 210, button groups 220, a T-bar 230, and a jog dial 240.

The controller controlling portion 391 is provided with a CPU and memory. The controller controlling portion 391 sends to and receives from the image server 101 signals, sends a signal for displaying the user interface to the display 210 and the system monitor 135, and sends request commands and input data received as input from the button group 22, the T-bar 230, the jog dial 240, the keyboard 112, and the mouse 113 to the image server 101.

Continuing, operations relating to pointer control are described next.

FIG. 4 is a flowchart for explaining an example of the pointer control processing executed by the pointer controlling apparatus shown in FIG. 1. In the above-described information processing system 100, the CPU 371 forming the controlling means issues commands to the controller controlling means 391, to display the user interface on the display 210 and the system monitor 135, controls the actions of the pointer according to input from the mouse 113 or the like, and executes the function of a predetermined program assigned to a predetermined region, in accordance with the operations of the user.

As shown in FIG. 4, first, in Step S401, when the pointer approaches a predetermined region of the GUI displayed on the display 210 and the system monitor 135, the CPU 371 prevents the pointer from advancing into the predetermined region. This indicates that, even though the user may attempt to make the pointer advance into the predetermined region, the pointer cannot advance into the predetermined region at this point in time. The "predetermined region" herein used may be, for example, a button or the like for activating or deactivating a program for implementing a specific function that runs on the image server 101, or a program operating region for operating a predetermined program. For example, in the state in which the pointer has advanced to the button, by performing input using an inputting means, the user can activate the functions of a predetermined program.

Next, in Step S405, the CPU 371 resets the timer T1 that has been executed by the program to be, for example, "0 (zero)". The timer T1 is run by a program executed by the CPU 371, and is a timer for measuring the contact time of the pointer and a predetermined region. The timer T1 stores the measured elapse time in the memory 381 or the like.

Next, in Step S410, upon receiving input data from the inputting means, the CPU 371 calculates the displacement amount of the inputting means. The pointer inputting means includes the above-described mouse 113.

Next, in Step S415, the CPU 371 calculates the position of the pointer, based on the displacement amount of the pointer inputting means calculated in Step S410. The controller controlling means 391 updates the position of the pointer by sending a signal for displaying the user interface on the display 210 and the system monitor 135, based on the calculated position of the pointer.

Next, in Step S420, the CPU 371 determines, based on the pointer position calculated in Step S415, whether or not the pointer has come into contact with a predetermined region. If the pointer is determined to have come into contact with the predetermined region, the processing moves to Step S425. If the pointer is determined not to have come into contact with the predetermined region, the processing moves back to Step S401.

Next, in Step S425, the CPU 371 determines whether or not the above-described timer T1 has been started. If the timer T1 is determined to have been started, the processing moves to Step S435. If the timer T1 is determined not to have been started, the processing moves to Step S430.

Next, in Step S430, the CPU 371 starts the above-described timer T1. The timer T1 measures the contact time of the pointer with a predetermined region. The timer T1 is a timer for measuring the contact time of the pointer and a predetermined region, and is run by a program executed by the CPU 71. The timer T1 stores the measured elapsed time in the memory 381. From the starting of the timer T1 until the resetting thereof in Step S405, the CPU 371 continuously updates the storage region for storing the amount of elapsed time from the start of the timer T1, based on the elapsed time.

Next, in Step S435, the CPU 371 determines whether or not the measured time of the timer T1 is equal to or greater than a predetermined time. If the time is determined to be greater than or equal to the predetermined time, the processing moves to Step S440. If the time is determined to be less than the predetermined time, the processing moves back to Step S410.

Next, in Step S440, the CPU 371 permits the pointer to advance into the predetermined region.

The CPU 371 thereby permits the pointer to advance into the predetermined region after a predetermined period of time has elapsed from the point in time when the pointer comes into contact of the boundary line of the predetermined region. Accordingly, the predetermined region can be securely protected against erroneous operation from the point in time at which the pointer comes into contact with the boundary line of the predetermined region until a predetermined period of time has elapsed. Furthermore, because the pointer is permitted to enter the predetermined region immediately after the predetermined period of time has elapsed and operations by the pointer in the region become possible, it becomes possible to provide a pointer controlling apparatus that protects the predetermined region against erroneous operation by the pointer without interrupting the operational flow, and without using an excessive amount of a display area.

FIG. 5 is a flowchart explaining another example of the pointer control processing executed by the pointer controlling apparatus according to another embodiment of the present invention.

As shown in FIG. 5, first, in Step S501, when the pointer approaches a predetermined region of the GUI displayed on the display 210 and the system monitor 135, the CPU 371 prevents the pointer from advancing into the predetermined region. The "predetermined region" herein used may be, for example, a button or the like for activating or deactivating a program for implementing a specific function that runs on the image server 101, or a program operating region for operating a predetermined program.

Next, in Step S505, the CPU 371 resets the timer T2 that has been executed by the program. The timer T2 is run by a program executed by the CPU 371, and is a timer for measuring the contact time of the pointer and a predetermined region. The timer T2 stores the measured elapsed time in the memory 381 or the like.

Next, in Step S510, upon receiving input data from the inputting means, the CPU 371 calculates the displacement amount of the inputting means. The pointer inputting means includes the above-described mouse 113.

Next, in Step S515, the CPU 371 calculates the position of the pointer, based on the displacement amount of the pointer inputting means calculated in Step S510. The controller controlling means 391 updates the position of the pointer by sending a signal for displaying the user interface on the display 210 and the system monitor 135, based on the calculated position of the pointer.

Next, in Step S520, based on the pointer position calculated in Step S515, the CPU 371 determines whether or not the pointer has advanced into a peripheral region, which contains the predetermined region and is greater than the predetermined region. If the pointer is determined to have advanced into the peripheral region containing the predetermined region, the processing moves to Step S525. If the pointer is determined not to have advanced into the peripheral region containing the predetermined region, the processing moves to Step S501. More specifically, the peripheral region containing the predetermined region is, for example, the vicinity surrounding a button or the like for operating a specific function of a predetermined program that runs on the image server 101, or the vicinity surrounding the outer boundary of a program operating region for activating or deactivating functions of a predetermined program.

Next, in Step S525, the CPU 371 determines whether or not the above-described timer T2 has been started. If the timer T2 is determined not to have been started, the processing moves to Step S535. If the timer T2 is determined not to have been started, the processing moves to Step S530.

Next, in Step S530, the CPU 371 starts the above-described timer T2. The timer T2 measures the contact time of the pointer with a predetermined region or a time in which the pointer is located within the peripheral time. The timer T2 is a timer for measuring the contact time of the pointer and a predetermined region or a time in which the pointer is located within the peripheral time, and is run by a program executed by the CPU 71. The timer T2 stores the measured elapsed time in the memory 381. From the starting of the timer T2 until the resetting thereof in Step S505, the CPU 371 continuously updates the storage region for storing the amount of elapsed time from the start of the timer T2, based on the elapsed time.

Next, in Step S535, the CPU 371 determines whether or not the measured time of the timer T2 is equal to or greater than a predetermined time. If the time is determined to be greater than or equal to the predetermined time, the processing moves to Step S540. If the time is determined to be less than the predetermined time, the processing moves back to Step S510.

Next, in Step S540, the CPU 371 permits the pointer to advance into the predetermined region.

The CPU 371 thereby permits the pointer to advance into the predetermined region after a predetermined period of time has elapsed from the point in time when the pointer advanced into a peripheral region containing the predetermined region. Accordingly, the predetermined region can be securely protected against erroneous operation from the point in time at which the pointer advanced into a peripheral region containing the predetermined region until a predetermined period of time has elapsed. Furthermore, since the pointer is permitted to enter the predetermined region immediately after the predetermined period of time has elapsed and operations by the pointer in the region become possible, it becomes possible to provide a pointer controlling apparatus that protects the predetermined region against erroneous operation by the pointer without interrupting the operational flow, and without using an excessive amount of the display area. Still further, as long as the pointer 820 remains within the peripheral region containing the predetermined region, the timer T2 is not reset. Accordingly, the pointer can move within the peripheral region containing the predetermined region until the predetermined time has elapsed. This leads to the fact that the pointer controlling apparatus can prevent the user's unintentional operation until the predetermined time has elapsed as long as the pointer 820 remains within the peripheral region.

FIG. 6 is a flowchart for explaining another example of the pointer control processing executed by the pointer controlling apparatus according to another embodiment of the present invention.

As shown in FIG. 6, first, in Step S601, when the pointer approaches a predetermined region of the GUI displayed on the display 210 and the system monitor 135, the CPU 371 prevents the pointer from advancing into the predetermined region under a predetermined condition. The "predetermined region" herein used may be, for example, a button or the like for activating or deactivating a program for implementing a specific function that runs on the image server 101, or a program operating region for operating a predetermined program.

Next, in Step S605, upon receiving input data from the inputting means, the CPU 371 calculates the displacement amount of the inputting means. The pointer inputting means includes the above-described mouse 113.

Next, in Step S610, the CPU 371 calculates the position of the pointer, based on the displacement amount of the pointer inputting means calculated in Step S605. The controller controlling means 391 updates the position of the pointer by sending a signal for displaying the user interface on the display 210 and the system monitor 135, based on the calculated position of the pointer.

Next, in Step S615, based on the pointer position calculated in Step S610, the CPU 371 determines whether or not the pointer has come into contact with a predetermined region. If the pointer is determined to have come into contact with the predetermined region, the processing moves to Step S620. If the pointer is determined not to have come into contact with the predetermined region, the processing moves back to Step S601.

Next, in Step S620, the CPU 371 puts a command inputting means into an input standby state. The command inputting means may be, for example, the keyboard 112, the button of the mouse 113 or a touch panel if the display 210 is a touch panel display, in a case where the mouse 113 is being used as the inputting means for operating the pointer.

Next, in Step S625, the CPU 371 notifies the user via a notifying means that the pointer has come into contact with the predetermined region in some manner. The notifying means may be, for example, a user interface displayed on the display 210 and the system monitor 135 under the control of the CPU 371, notifies the user that the pointer has come into contact with the predetermined region by, for example, changing the display characteristics of the GUI displayed on the display 210 and the system monitor 135. Furthermore, the notifying means may also be provided with a device for conveying a change with respect to at least any one of sensory perceptions of the user (for example, visual sense, auditory sense, tactile sense, olfactory sense, gustatory sense) so as to notify the user that the pointer has come into contact with the predetermined region by conveying a change with respect to a sensory perception of the user (for example, visual sense, auditory sense, tactile sense, olfactory sense, gustatory sense). Upon receiving this notification, the user can perform input operation using the command inputting means as required.

Next, in Step S630, the CPU 371 determines whether or not input has been made to the command inputting means, the processing moves to Step S635. If it is determined that no input has been made to the command inputting means, the processing moves back to Step S610.

Next, in Step S635, the CPU 371 permits the pointer to advance into the predetermined region.

As described above, the CPU 371 causes the user to be notified by the notifying means of the fact that the pointer has come into contact with the predetermined region. In response to receiving the notification, the user can perform input operations by the command inputting means to permit the pointer to advance into the predetermined region. Accordingly, the predetermined region can be securely protected against erroneous operation from the point in time that the notifying means notifies the user that the pointer has come into contact with the predetermined region until the user performs input by way of the command inputting means in response to reception of the notification. Furthermore, as soon as the user performs input operation by way of the command inputting means after notification is provided to the user by the notifying means, the pointer is permitted to advance into the predetermined region, and the user can then operate the functions of the predetermined program by performing input operation by way of the command inputting means. Accordingly, a pointer controlling apparatus can be provided which prevents user operational errors in the predetermined region without interrupting operational flow or using an excessive amount of space on the display area.

FIG. 7 is a flowchart for explaining another example of the pointer control processing executed by the pointer controlling apparatus according to another embodiment of the present invention.

As shown in FIG. 7, first, in Step S701, when the pointer approaches a predetermined region of the GUI displayed on the display 210 and the system monitor 135, the CPU 371 prevents the pointer from advancing into the predetermined region. The "predetermined region" herein used may be, for example, a button or the like for activating or deactivating a program for implementing a specific function that runs on the image server 101, or a program operating region for operating a predetermined program.

Next, in Step S705, the CPU 371 resets the timer T3 that has been executed by the program to be, for example, "0 (zero)". The timer T3 is run by a program executed by the CPU 371, and is a timer for measuring the contact time of the pointer and a predetermined region. The timer T3 stores the measured elapse time in the memory 381 or the like.

Next, in Step S710, upon receiving input data from the inputting means, the CPU 371 calculates the displacement amount of the inputting means. The pointer inputting means includes the above-described mouse 113.

Next, in Step S715, the CPU 371 calculates the position of the pointer, based on the displacement amount of the pointer inputting means calculated in Step S710. The controller controlling means 391 updates the position of the pointer by sending a signal for displaying the user interface on the display 210 and the system monitor 135, based on the calculated position of the pointer.

Next, in Step S720, based on the pointer position calculated in Step S715, the CPU 371 determines whether or not the pointer has come into contact with a predetermined region. If the pointer is determined to have come into contact with the predetermined region, the processing moves to Step S725. If the pointer is determined not to have come into contact with the predetermined region, the processing moves back to Step S701.

Next, in Step S725, the CPU 371 determines whether or not the above-described timer T3 has been started. If the timer T3 is determined to have been started, the processing moves to Step 735. If the timer T3 is determined not to have been started, the processing moves to Step S730.

Next, in Step S730, the CPU 371 starts the above-described timer T3. The timer T3 measures the contact time of the pointer with a predetermined region. The timer T3 is a timer for measuring the contact time of the pointer and a predetermined region, and is run by a program executed by the CPU 71. The timer T3 stores the measured elapsed time in the memory 381. From the starting of the timer T3 until the resetting thereof in Step S705, the CPU 371 continuously updates the storage region for storing the amount of elapsed time from the start of the timer T3, based on the elapsed time.

Next, in Step S735, the CPU 371 notifies the user via a notifying means that the pointer has come into contact with the predetermined region. The notifying means may be, for example, a user interface displayed on the display 210 and the system monitor 135 under the control of the CPU 371, notifies the user that the pointer has come into contact with the predetermined region by, for example, changing the display characteristics of the GUI displayed on the display 210 and the system monitor 135. Furthermore, the notifying means may also be provided with a device for conveying a change with respect to at least any one of sensory perceptions of the user (for example, visual sense, auditory sense, tactile sense, olfactory sense, gustatory sense) so as to notify the user that the pointer has come into contact with the predetermined region by conveying a change with respect to a sensory perception of the user (for example, visual sense, auditory sense, tactile sense, olfactory sense, gustatory sense). Upon receiving this notification, the user can perform input operation using the command inputting means as required.

Next, in Step S740, the CPU 371 determines whether or not the measured time of the timer T3 is equal to or greater than a predetermined time. If the time is determined to be greater than or equal to the predetermined time, the processing moves to Step S745. If the time is determined to be less than the predetermined time, the processing moves back to Step S710.

Next, in Step S745, the CPU 371 permits the pointer to advance into the predetermined region.

As described above, the CPU 371 causes the user to be notified by the notifying means of the fact that the pointer has come into contact with the predetermined region, and permits the pointer to advance into the predetermined region after a predetermined period of time has elapsed. Accordingly, the predetermined region can be securely protected against erroneous operation in a user-friendly manner from the point in time that the notifying means notifies the user that the pointer has come into contact with the predetermined region until the predetermined period of time has elapsed. Furthermore, since the pointer is permitted to enter the predetermined region immediately after the predetermined period of time has elapsed and operations by the pointer in the region become possible, it becomes possible to provide a pointer controlling apparatus that protects against erroneous operation by the pointer of a predetermined region without interrupting the operational flow, and without using an excessive amount of a display area.

FIG. 8 shows a view of an example of a display screen displayed on the system monitor 135 of the information processing system 100.

As shown in FIG. 8, on the screen 800 displayed on the system monitor 135, arranged on the screen 800 are regions in the form of windows and the like for displaying the operating results, status and various other types of information relating to programs running on the image server 101 of the information processing system 100 and being executed by the CPU 371. Since real-time performance is regarded as important for the information processing system 100, to the extent possible, the functions are not rendered in a hierarchical format on the screen, but arranged so as to be easy to see.

The window 801 shows a region in which more than one button 810 is displayed. Since the information processing system 100 is a system for which real-time performance is regarded as important, functions that require a command from the user to initiate operation are not displayed in a hierarchical format, and are respectively assigned to one or more buttons 810 arranged so as to be operable. The pointer 820 is moved on the screen 800 by input from the pointer inputting means. The pointer inputting means can be a pointing device such as the mouse 135 or the like.

FIG. 9A to 9C show views of buttons 810 included in the screen displayed in FIG. 8.

Referring to FIG. 9A, the window 801, which is a region for displaying the regions showing the buttons 810, has disposed therein one button 810. The button 810 has assigned thereto a predetermined function of a program running on the image server 101 and executed by the CPU 371. The pointer 820 is moved to the interior of the button region, input is performed from an inputting means, such as by pushing the mouse button on the mouse 113, whereby the predetermined function is executed by the CPU 371 on the image server 101. The window 801 is not necessarily required, and the region containing the button 810 can be a region for which entry thereinto by the pointer is capable of being detected.

Referring to FIG. 9B, the window 801, which is a region for displaying the regions showing the buttons 810, has disposed therein four buttons 810A to 810D. Referring to FIG. 9C, the window 801, which is a region containing the regions displaying the buttons 810, has disposed therein four buttons 810A to 810D arranged in a 2×2 grid layout. The buttons 810 may be disposed as a plurality of buttons within the window 801, arranged in a single rank or file, or in a plurality of ranks or files.

FIGS. 10A to 10C show screen views of the pointer 820 and the button 810 displayed when using the pointer controlling apparatus 820.

As shown in FIG. 4 and FIG. 10A, the CPU 371 displays the pointer 820 and the button 810 with a distance separating therebetween. The position of the pointer 820 is intended to indicate a tip of the arrow mark (the hotpoint). At first, in Step S401, the CPU 371 prevents the pointer 820 from advancing into the display area of the button 810. Next, in Step S405, the CPU 371 resets the timer that has been executed by the program to be zero (0). Since the timer has not been started at this point in time, processing cannot be performed. Next, in Step S410, upon receiving input data from the inputting means, the CPU 371 calculates the displacement amount of the inputting means. In Step S415, the CPU 371 calculates the position of the pointer.

Next, in Step S420, since there is a distance separating between the pointer 820 and the button 810, as shown in FIG. 10A, the CPU 371 determines that the pointer 820 and the button 810 are not in contact, and returns the processing to Step S401. In the state shown in FIG. 10A, the processing of the above-described Steps S401 to S420 is repeated.

As shown in FIG. 4 and FIG. 10B, the CPU 371 causes the pointer 820 to come into contact with the button 810, and displays the state thereof. In the above-described Step S401, since the CPU 371 has prevented the pointer 820 from advancing into the button 810, the pointer 820 does not advance into the region of the button 810. Therefore, the button 810 is in a state in which it is protected from any input operation. In Step S420, since the CPU 371 has caused the pointer 820 and the button 820 to come into contact and displayed the state thereof, the CPU 371 determines that the pointer 820 and the button 810 are in contact with each other, and the processing moves to Step S425.

Next, in Step S425, the CPU 371 determines whether or not the timer has been started. Then, in Step S430, the CPU 371 starts the timer. Continuing, in Step S435, if the CPU 371 determines that the predetermined button protection time has not elapsed, the processing moves to Step S410. Next, in Step S410, upon receiving input from the pointer inputting means, the CPU 371 calculates the displacement amount of the pointer inputting means. Continuing, in Step S415, the CPU 371 calculates the position of the pointer.

Next, in Step S420, since the CPU 371 has caused the pointer 820 and the button 820 to come into contact and display the state thereof, the CPU 371 determines that the pointer 820 and the button 810 are in contact with each other, and the processing moves to Step S425. Continuing, in Step S425, since the CPU 371 started the timer in Step S430, the CPU 371 determines that the timer is running, and the processing moves to Step S435. Next, in Step S435, since the predetermined button protection time has not elapsed, the CPU 371 determines that the predetermined button protection time has not elapsed and the processing moves to Step S410. In the state shown in FIG. 10B, until the predetermined button protection time has elapsed, the processing of Steps S410 to S435 is repeated.

When the pointer 820 comes into contact with the button 820, if the speed at which the pointer 820 is moving exceeds a predetermined movement speed, the CPU 371 controls the pointer so that it does not stop at the side of the button 810 from which it has approached, but crossed over the button 810 to the opposite side thereof. However, the CPU does not determine that the pointer has advanced into the display area of the button 810 and protects the button 810 from being operated.

In Step S420, during the state in which the CPU 371 is repeating the processing of the Steps S410 to S435, if the CPU 371 determines that the pointer 820 and the button 810 are not in contact with each other, the processing moves to Step S401, and the CPU 371 again prevents the pointer 820 from advancing into the display area of the button 820. Next, in Step S405, the CPU 371 resets the timer program to be zero (0). Therefore, once the pointer 820 and the button 810 have been separated from each other, the CPU 371 again prevents the pointer 820 from advancing into the display area of the button 810 unless the contact between the pointer 820 and the button 810 is maintained during the interval of the re-triggered predetermined button protection time. Accordingly, the pointer controlling apparatus is able to more securely protect the button 810.

As shown in FIG. 4 and FIG. 10C, the CPU 371 permits the pointer 820 to advance onto the button 810, and displays the state thereof. During the state in which the processing of Steps S410 to S435 is being repeated, if the above-described predetermined button protection time elapses, the CPU 371 determines in Step S435 that the predetermined button protection time has elapsed, and the processing moves to Step S440. In Step S440, the CPU 371 permits the pointer 820 to advance onto the button 810. It becomes possible for the pointer 820 to advance into the region of the button 810, and for the user to operate the function of the program that has been assigned to the button 810. Furthermore, in a case where there has been input made from, for example, a predetermined input means other than the input means which operates the pointer, the CPU 371 may permit the pointer 820 to advance onto the button 810. The predetermined inputting means can be, for example, in a case where the pointer is being operated by the mouse 11, the keyboard 12, the button of the mouse 113, and the touch panel if the display 210 is a touch panel display.

FIGS. 11A to 11D show screen views of the pointer 820, the button 810, and the pointer detection region 1101 occurring during the execution of the pointer controlling processing by the pointer controlling apparatus described with reference to FIG. 5.

As shown in FIG. 5 and FIG. 11A, the CPU 371 displays the pointer 820 and the pointer detection region (peripheral region) 1101 with a distance separating therebetween. The pointer detection region 1101 is defined as a region surrounding the button 810 defined by the distance between the boundary line of the region of the button 810 and a line separated by a predetermined distance from the outside of the button region, which serves as another boundary line. The pointer detection region 1101 is, as shown in FIG. 11A, invisible; however, it may also be a visibly displayed region. In Step S501, at first, the CPU 371 prohibits the pointer 820 from advancing to the button 810. Next, in Step S505, the CPU 371 resets the timer operated by the program to be zero (0). Since the timer has not been started, processing is not performed. Next, in Step S510, upon receiving upon receiving input from the inputting means, the CPU 371 calculates the displacement amount of the inputting means. Next, in Step S515, the CPU 371 calculates the position of the pointer. Continuing, in Step S520, because the pointer 820 and the pointer detecting region 1101 have a distance separating therebetween and are displayed therewith, the CPU 371 determines that the pointer 810 and the pointer detecting region 1101 are not in contact with each other, and the processing moves to Step S501. In the state shown in FIG. 11A, the processing of the above-described Steps S501 to S520 is repeated.

As shown in FIG. 5 and FIG. 11B, the CPU 371 permits the pointer 820 to advance into the pointer detecting region 1101, and displays the state thereof. In the above-described Step S501, since the CPU 371 prohibits the pointer 820 from advancing into the region of the button 810, the pointer 820 cannot advance into the region of the button 810. In Step S520, the CPU 371 determines whether or not the pointer 820 has advanced into the pointer detecting region 1101. Since the pointer 820 is displayed as having advanced into the pointer detecting region 1101, the CPU 371 determines that the pointer 820 has advanced into the pointer detecting region 1101, and the processing moves to Step S525.

Next, in Step S525, the CPU 371 determines whether or not the timer has been started. Since the timer has not yet been started, the CPU 371 determines that the timer has not been started, and the processing moves to Step S530. Next, in Step S530, the CPU 371 starts the timer. Continuing, in Step S535, the CPU 371 determines whether or not the timer has reached the predetermined button protection time. Until the timer reached the predetermined button protection time, the CPU 371 determines the predetermined button protection time has not been reached, and the processing moves to Step S510. Next, in Step S510, upon receiving input from the pointer inputting means, the CPU 371 calculates the displacement amount of the pointer inputting means. Continuing, in Step S515, the CPU 371 calculates the position pointer.

In Step S520, the CPU 371 determines whether or not the pointer 820 has advanced into the pointer detecting region 1101. Since the pointer 820 is displayed as having advanced into the pointer detecting region 1101, the CPU 371 determines that the pointer 820 has advanced into the pointer detecting region 1101, and the processing moves to Step S525. Next, in Step S525, the CPU 371 determines whether or not the above-described timer has been started. Since the timer was started in the above-described Step S530, the CPU 371 determines that the timer has been started, and the processing moves to Step S535. In this manner, until the CPU 371 determines that the timer has reached the predetermined button protection time, the CPU 371 repeats the processing of Steps S510 to S535. When the timer reaches the predetermined button protection time, in Step S535, the CPU 371 determines that the timer has reached the predetermined button protection time, and the processing moves to Step S540. Next, in Step S540, the CPU 371 permits the pointer 820 to advance to the button 810.

In Step S520, in the state in which the CPU 371 has determined that the predetermined button protection time has not been reached and the processing of Steps S510 to S535 is being repeated, if it is determined that the pointer is not within the pointer detecting region 1101, the processing moves to Step S501. Next, in Step S501, the CPU 371 prohibits the pointer 820 from advancing onto the button 810. Continuing, in Step S505, the CPU 371 resets the timer to be zero (0). Therefore, in a case where the pointer 820 has once left the pointer detecting region 1101 after having once advanced thereinto, in the state in which the pointer 820 has advanced into and is within the pointer detecting region 1101, the CPU 371 prohibits the pointer 820 from advancing onto the button 810 unless the re-triggered predetermined button protection time has elapsed. Accordingly, the pointer controlling apparatus is able to more securely protect the button 810 from erroneous operation.

Referring to FIG. 11C, the CPU 371 displays the pointer 820 as being in contact with the button 810. As described above, during the interval from the starting of the timer until the predetermined button protection time has elapsed, if the pointer 820 is maintained in the state in which it has advanced into the pointer detecting region 1101, the timer is not reset. By setting the size of the pointer detecting region 1101 appropriately with respect to the button 810, the permissible range of movement of the pointer can be arbitrarily set for the interval from the starting of the timer until the predetermined button protection time has elapsed, whereby the timer can be prevented from being reset due to unintentional operation of the pointer inputting means.

As shown in FIG. 5 and FIG. 11D, the CPU 371 displays the pointer 820 as having advanced into the display area of the button 810. In the above-described Step S440, the the CPU 371 has permitted the pointer 820 to advance to the button 810. Accordingly, it becomes possible for the pointer 820 to advance into the region of the button 810, and for the user to operate the function of the program that has been assigned to the button 810.

FIG. 12 shows screen views of the pointer 820, the button 810, and a notification icon 1201 occurring during the execution of the pointer controlling processing by the pointer controlling apparatus described with reference to FIG. 6.

Referring both to FIG. 6 and FIG. 12, at first, in Step S601, the CPU 371 prohibits the pointer 820 from advancing into the display area of the button 810. Next, in Step S605, upon receiving input data from the pointer inputting means, the CPU 371 calculates the displacement amount of the pointer inputting means. Step S610, the CPU 371 calculates the position of the pointer. Next, in Step S615, if the pointer 820 and the button 810 are in contact with each other, as shown in FIG. 12, the CPU 371 determines that the pointer 820 and the button 810 are in contact with each other, and the processing moves to Step S602. If the pointer 820 and the button 810 are not in contact with each other, the CPU 371 determines that the pointer 820 and the button 810 are not in contact with each other, and the processing returns to Step S601. The processing of Steps S601 to 615 is repeated until the pointer 820 and the button 810 come in contact with each other.

Next, in Step S620, the CPU 371 puts the command inputting means into the input standby state. The command inputting means is a means by which the user is able to input commands, and it is preferred that the command inputting means is a means other than the inputting means described above. Preferably, the command inputting means is a means having an inputting operation capable of being distinguished from that of the inputting means, such as, when the mouse 13 is the inputting means, on or more of the keyboard 112, the button of the mouse 113, and the touch panel if the display 210 is a touch panel display, or the like. Next, in Step S625, the CPU 371 notifies information to the user. The information is a notification icon 1201 in the form of a keyhole and a key. By displaying the keyhole and key icon 1201, the user is informed that the processing is in the command inputting standby mode, and that the pointer 820 is prohibited from advancing onto the button 810. The information notification may be provided through the visual sensory perception of the user, as described above, or through another sensory perception of the user. For example, the notification may be provided by means of a sound generating device whereby a sound is generated to provide notification through the auditory sensory perception of the user; the notification may be provided by means of a vibration generating device whereby a vibration is generated to provide notification through the tactile sensory perception of the user; or the notification may be provided by means of a scent generating device whereby a scent is generated to provide notification through the olfactory sensory perception of the user.

Next, in Step S630, the CPU 371 determines whether or not input has been made from the command inputting means. If a command has not been inputted, the processing moves to Step S610, and repeats the processing of the above-described Steps S601 to S630. If a command has been inputted, the processing moves to Step S635. In Step S635, the CPU 371 permits the pointer 820 to advance to the button 810. Therefore, since the CPU 371 prohibits the pointer 820 from advancing onto the button 810 until the user inputs a command in response to the notification, the button 810 can be securely protected from unintentional operation by the user. In a case where the pointer 820 is permitted to advance to the button 810, the CPU 371 may, for example, leave the display of the notification icon 1201 unchanged, may display an animation of the notification icon 1201 showing the key being inserted into the keyhole and turned so as to provide notification to the user that the pointer 820 has been permitted to advance to the button 810, or may delete the notification icon 1201 to inform the user that the prohibiting of the advancement of the pointer 820 to the button 810 has been cleared.

FIGS. 13A to 13C show screen views of the pointer 820, the button 1301, and the pointer detection region 1101 occurring during the execution of the pointer controlling processing by the pointer controlling apparatus described with reference to FIG. 7.

As shown in FIG. 7 and FIG. 13A, the CPU 371 displays the pointer 820 and the button 1301 with a distance separating therebetween. First, in Step S701, the CPU 371 prohibits the pointer 820 from advancing onto the button 1301. Next, in Step S705, the the CPU 371 resets the timer that is operated by the program to be zero (0). Since the timer has not yet been started, processing is not performed. Next, in Step S710, upon receiving input from the pointer inputting means, the CPU 371 calculates the displacement amount of the pointer inputting means. Next, in Step S715, the CPU 371 calculates the position of the pointer. Next, in Step S720, the CPU 371 determines whether or not the pointer 820 and the button 1301 are in contact with each other. Since the pointer 820 and the button 1301 are displayed having a space separating therebetween, the CPU 371 determines that the pointer 820 and the button 1301 are not in contact with each other, and the processing moves to Step S701. In the state shown in FIG. 13A, the processing of the above-described Steps S701 to S720 is repeated.

As shown in FIG. 7 and FIG. 13B, the CPU 371 causes the pointer 820 to come into contact with the button 1301, and displays the state thereof. Furthermore, in the above-described Step S701, since the CPU 371 has prohibits the pointer 820 from advancing onto the button 1301, the pointer 820 does not advance to the button 1301, and the button 1301 is protected from input operations thereto. Still further, the CPU 371 displays the button 1301 as being covered with a transparent glass-like cover, and notifies the user that the pointer 820 and the button 1301 are in contact with each other and the pointer 820 is prohibited from advancing onto the button 1301. Next, in Step S720, the CPU 371 determines whether or not the pointer 820 and the button 1301 are in contact with each other. Since the pointer 820 and the button 1301 are caused to come into contact with each other and the state thereof is displayed, the CPU 371 determines that the pointer 820 and the button 1301 are in contact with each other, and the processing moves to Step S725.

Next, in Step S725, the CPU 371 determines whether or not the timer has been started. Since the timer has not yet been started, the CPU 371 determines that the timer has not been started, and the processing moves to Step S730. Next, in Step S730, the CPU 371 starts the timer. Moreover, in Step S735, the CPU 371 displays the button 1301 as being covered with a transparent glass-like cover, and notifies the user that the pointer 820 and the button 1301 are in contact with each other and the pointer 820 is prohibited from advancing onto the button 1301, and the processing moves to Step S740. Continuing, in Step S740, the CPU 371 determines whether or not the timer has reached the predetermined button protection time. Until the timer reaches the predetermined button protection time, the CPU 371 determines the predetermined button protection time has not been reached, and the processing moves to Step S710.

Next, in Step S710, upon receiving input from the inputting means, the CPU 371 calculates the displacement amount of the pointer means. Next, in Step S715, the CPU 371 calculates the position of the pointer, based on the displacement amount of the pointer inputting means. Next, in Step S720, the CPU 371 determines whether or not the pointer 820 and the button 1301 are in contact with each other. Since the pointer 820 and the button 1301 are caused to come into contact with each other and the state thereof is displayed, the CPU 371 determines that the pointer 820 and the button 1301 are in contact with each other, and the processing moves to Step S725. Next, in Step S725, the CPU 371 determines whether or not the timer has been started. Since the timer was started in the above Step S730, the CPU 371 determines that the timer has been started, and the processing moves to Step S735. Furthermore, the CPU 371 displays the button 1301 as being covered with a transparent glass-like cover, notifies the user that the pointer 820 and the button 1301 are in contact with each other, the pointer 820 is prohibited from advancing onto the button 1301, and the processing moves to Step S740. Continuing, in Step S740, the CPU 371 determines whether or not the timer has reached the predetermined button protection time. Until the timer reaches the predetermined button protection time, the CPU 371 determines the predetermined button protection time has not been reached, and the processing moves to Step S710. Until the timer reaches the predetermined button protection time, the processing of the above-described Steps S710 to S740 is repeated. Therefore, since the CPU 371 provides notification to the user of the pointer control state by notifying the user that the pointer 820 and the button 1301 are in contact with each other and the pointer 820 is prohibited from advancing onto the button 1301, the button 1301 can be securely protected in a user-friendly manner. When the timer reaches the predetermined button protection time, in Step S740, the CPU 371 determines that the timer has reached the predetermined button protection time, and the processing moves to Step S745.

In Step S745, the CPU 371 permits the pointer 820 to advance to the button 1301. FIG. 13C shows the CPU 371 deleting the display showing the button 1301 covered by the transparent glass-like cover, and the pointer 820 advancing onto the button 1301. In a case where the pointer 820 has been permitted by the CPU 371 in Step S745 to advance to the button 1301, the user may be notified that the prohibiting of the pointer 820 from advancing onto the button 1301 has been cleared by deleting the display showing the button 1301 covered by the transparent glass-like cover, for example, by showing a display in which a glass-like cover gradually opens along with the advancing of the timer, and opens completely at the same time that the button protection time elapses, whereby a notification can be provided to the user regarding the period of time remaining in the predetermined button protection time.

In the state in which the processing of the above-described Steps S710 to S740 is being repeated, in Step S720, the CPU determines whether or not the pointer 820 and the button 1301 are in contact with each other. If the pointer 820 and the button 1301 are displayed having a space separating therebetween, the CPU 371 determines that the pointer 820 and the button 1301 are not in contact with each other, and the processing moves to Step S701. Next, in Step S701, the CPU 371 prohibits the pointer 820 from advancing onto the button 1301. Continuing, in Step S705, the CPU 371 resets the timer that is operated by the program to 0 (zero). Accordingly, if the pointer 820 has once left the region of the button 1301 and then again comes into contact with the button 1301, the CPU 371 restarts the measurement of the contact time, and if the pointer is not maintained in contact with the button 1301, the pointer 820 is not permitted to advance to the button 1301 until the predetermined button protection time has elapsed. Accordingly, the pointer controlling apparatus is able to more securely protect the button 1301 from erroneous operation.

Referring both to FIG. 7 and FIGS. 13A to 13C, the display in which the glass-like cover is shown covering the button 820 shown in FIG. 13B is displayed in Step S720 when it was determined that the pointer 820 was in contact with the button 810; however, the display is not limited thereto, as the display showing the glass-like cover covering the button 820 may be displayed in Step S701 in a case where the pointer 820 has been prohibited from advancing onto the button 810.

FIG. 14 shows a screen view of the pointer 820, the button 810 and a contact maintaining region 1401.

As shown in FIG. 14, the CPU 371 displays the pointer 820, the button 810, and the contact maintaining region 1401, which is a region surrounding the button 810. The contact maintaining region 1401 is not visible in FIG. 14; however, it may also be displayed as, for example, a visible region. According to FIG. 4, the timer for measuring the contact time can be started at the point in time when the pointer 820 comes into contact with the button 810, and the pointer 820 is permitted to advance to the button 810 after the predetermined button protection time has elapsed; however, even if the pointer 820 once leaves the button 801 after having come into contact with the button 810 and triggering the start of the timer, if the pointer 820 remains within the contact maintaining region 1401, the timer is not reset. Therefore, it becomes possible to provide a more flexible and user-friendly GUI than for that in which the timer is reset immediately upon the determination that the pointer 820 and the button 810 are not in contact with each other.

FIG. 15 shows a screen view of the pointer 1501 and the button 810.

As shown in FIG. 15, the CPU 371 displays the pointer 1501 as an hour-glass shaped icon. As described above, the CPU 371 starts the timer at the point in time when the pointer 1501 comes into contact with the button 810, and permits the pointer 1501 to advance to the button 810 after the predetermined button protection time has elapsed. Here, the CPU 371 changes the display of the pointer 1501 from that of the normal arrow shaped icon to the hour-glass icon when the timer starts measuring the time. Therefore, the CPU 371 can notify the user that the pointer 1501 has been prohibited from advancing onto the button 810. Furthermore, when the pointer 1501 is permitted to advance to the button 810, the CPU 371 changes the display of the pointer icon from that of the hour-glass shaped icon to the normal, arrow shaped icon. Therefore, the CPU 371 can notify the user that the pointer 1501 has been permitted to advance to the button 810. In addition, the CPU 371 may, for example, display the hour-glass shaped icon of the pointer 1501 in an animated manner in which the amount of sand in the hour-glass decreases in accordance with the passage of time, whereby the progression of the measurement of time by the timer may be displayed. Moreover, by displaying the hour-glass shaped icon in an animated manner in which the sand in the hour glass icon disappears when the predetermined button protection time has elapsed, the period of time remaining before the pointer 1501 is permitted to advance to the button 810 may be displayed.

FIG. 16 shows a screen view of the pointer 820 and the button 1601.

As shown in FIG. 16, the CPU 371 displays the button 1601 in a manner in which the button 1601 is shown covered by a transparent glass-like cover. As described above, the timer starts measuring time from the point in time when the pointer 820 comes into contact with the button 1601, and when the predetermined button protection time elapses, the pointer 820 is permitted to advance to the button 1601. At the point in time when the timer starts measuring time, the CPU 371 changes the display of the button 1601 from the normal display to a display in which the button 1601 is shown as if covered by a transparent glass-like cover, as shown in FIG. 16. Therefore, the CPU 371 can provide notification that the pointer 820 has been prohibited from advancing onto the button 1601. Furthermore, the CPU 371 changes the display of the button 1601 from that of the display in which it is shown as if covered with a transparent glass-like cover to the normal display when the pointer 810 has been permitted to advance to the button 1601. Therefore, the CPU 371 can provide notification that the pointer 820 has been permitted to advance to the button 1601 in an animated manner in which the glass portion is gradually raised from the lowered position (or any other direction) and gradually opened in accordance with the passage of time. Accordingly, it is possible to show the user the progression of the measurement of time by the timer. In addition, the CPU 371 may display the button 1601 in an animated manner in which the glass-like cover is opened completely at precisely the instant that the predetermined button protection time elapses, so as to show the period of time remaining until the pointer 820 is permitted to advance to the button 1601.

FIGS. 17A and 17B show screen views of the pointer 820, the button 810, a notification icon 1701, and a notification icon 1710.

As shown in FIG. 17A, the CPU 371 displays a key shaped notification icon 1710 and a keyhole shaped notification icon 1701 in the vicinity of the button 810. As described above, the CPU 371 starts the time measuring by the timer after the pointer 820 comes into contact with the button 810, and if the predetermined button protection time elapses, the pointer 820 is permitted to advance to the button 810. The CPU 371 displays the keyhole shaped icon 1701 in the vicinity of the button 810 at the point in time when the timer starts measuring time. Therefore, it is possible to provide a notification that the pointer 820 has been prohibited from advancing onto the button 810. Furthermore, as shown in FIG. 17B, a key-shaped notification icon 1710 is shown when the predetermined button protection time has elapsed, and the lock opening animation is shown. Accordingly, it is possible to provide a notification that the pointer 820 is permitted to advance to the button 810.

FIGS. 18A and 18B show screen views of the pointer 820, the button 810, a notification icon 1801, and a notification icon 1810.

As shown in FIG. 18A, the CPU 371 displays a keyhole shaped notification icon 1801 in the vicinity of the button 810. As described above, the CPU 371 starts the time measuring by the timer when the pointer 820 advances to the button 810 from outside the region of the button 810, and if predetermined button protection time elapses, the pointer 820 is permitted to advance to the button 810. The CPU 371 displays the keyhole-shaped icon 1801 in the vicinity of the pointer 820 at the point in time when contact force region 1901. Therefore, it is possible to show the user that the pointer 820 has been prohibited from advancing onto the button 810. Furthermore, as shown in FIG. 18B, key-shaped notification icon 1801 is shown when the predetermined button protection time has elapsed, and the lock opening animation is shown. Accordingly, it is possible to show the user that the pointer 820 is permitted to advance to the region of the button 810.

FIGS. 19A and 19B show screen views of the pointer 820, the button 810, and a contact force region 1901.

As shown in FIG. 19A, the contact force region 1901 containing the button 810 is displayed. As described above, the timer starts measuring time from the point in time when the pointer 820 comes into contact with the button 810, and if the predetermined button protection time has elapsed, the pointer 820 is permitted to advance into the region of the button 810. When the pointer 820 advances into contact force region 1901, as shown in FIG. 19B, the CPU 371 forcibly moves the pointer 820 to a position in which it is in contact with the button 810, and the measuring of time by the timer is started. So long as there is no input from the pointer inputting means to move the pointer 802 away from the button 810 with more than a predetermined distance, the state of contact between the pointer 802 and the button 810 is maintained. Therefore, it becomes possible to provide a more flexible and user-friendly GUI with respect to unintentional erroneous operations by the pointer inputting means than for that in which the timer is reset immediately upon the loss of contact between the pointer 820 and the button 810.

FIG. 20 shows a screen view of the pointer 820, the button 810, and a notification icon 2001.

As shown in FIG. 20, the CPU 371 displays an OK hand gesture shaped icon in the vicinity of the pointer 820. As described above, the timer starts measuring time from the point in time when the pointer 820 comes into contact with the button 810, and if the predetermined button protection time has elapsed, the pointer 820 is permitted to advance into the region of the button 810. The CPU 371 displays the OK hand gesture shaped notification icon 3201 when the predetermined button protection time has elapsed. Accordingly, it is possible to inform the user that the pointer 820 is permitted to advance to the button 810.

As described above, in the present embodiment of the present invention, the pointer controlling apparatus permits the pointer 820 to advance to the button 810 after a predetermined period of time has elapsed from the point in time when the pointer 820 comes into contact with the button 810. Therefore, the button 820 can be securely protected from the point in time when the pointer 820 comes into contact with the boundary line of the button 810 until a predetermined button protection time has elapsed. Furthermore, the pointer 820 is immediately permitted to advance to the button 810 after the predetermined button protection time has elapsed. Accordingly, a pointer controlling apparatus which protects the button 810 against erroneous operation of the pointer 820 without interrupting the operational flow or using an excessive amount of space on the display area can be provided.

It should be noted that, in the above-described embodiment, the displaying of the button 810 and pointer 820 have been carried out by operations of the program executed by the CPU 371 of the image server 101; however, the displaying of the button 810 and pointer 820 can be carried out by operating a portion of the program by the controller controlling means 391 of the controller 111.

Embodiments of the present invention has been described above, but the present invention is not limited to the above-described embodiments. Furthermore, the effects of the present embodiment of the present invention described herein represent no more than an enumeration of favorable examples of the effects that can be achieved by application of the present invention, and effects of the present invention are not limited to those described in the present embodiment of the present invention.

For example, aside from application in application software for use on a computer with a GUI, a pointer controlling device according to the present invention can also be applied to mobile phones, memory-based audio devices, game devices, computerized home electronics, televisions, car navigation systems, security systems, Bank ATMs, touch panel type input devices, and so on. The present invention is applicable to any devices so long as the devices are provided with a GUI or GUI functionality.

BRIEF DESCRIPTION OF THE DRAWINGS

FIG. 8 is a view of an example of a display screen displayed on a system monitor of the information processing system shown in FIG. 1;

FIG. 10A is a view of examples of a pointer and a button in the screen display shown in FIG. 8;

FIG. 10B is a view similar to FIG. 10A showing that the pointer comes into contact with the button;

FIG. 10C is a view similar to FIG. 10A showing that the pointer advanced into the button;

FIG. 11D is a view similar to FIG. 11A showing that the pointer has advanced into the button;

FIG. 12 is a view of examples of a pointer, a button, and a notification icon in the screen display shown in FIG. 8;

FIG. 13A is a view of examples of a pointer and a button in the screen display shown in FIG. 8;

FIG. 15 is a view of examples of a pointer and a button in the screen display shown in FIG. 8;

FIG. 16 is a view of examples of a pointer and a button in the screen display shown in FIG. 8;

FIG. 17A is a view of examples of a pointer, a button, and a notification icon in the screen display shown in FIG. 8;

EXPLANATION OF THE NUMERAL REFERENCES

Figure 1:
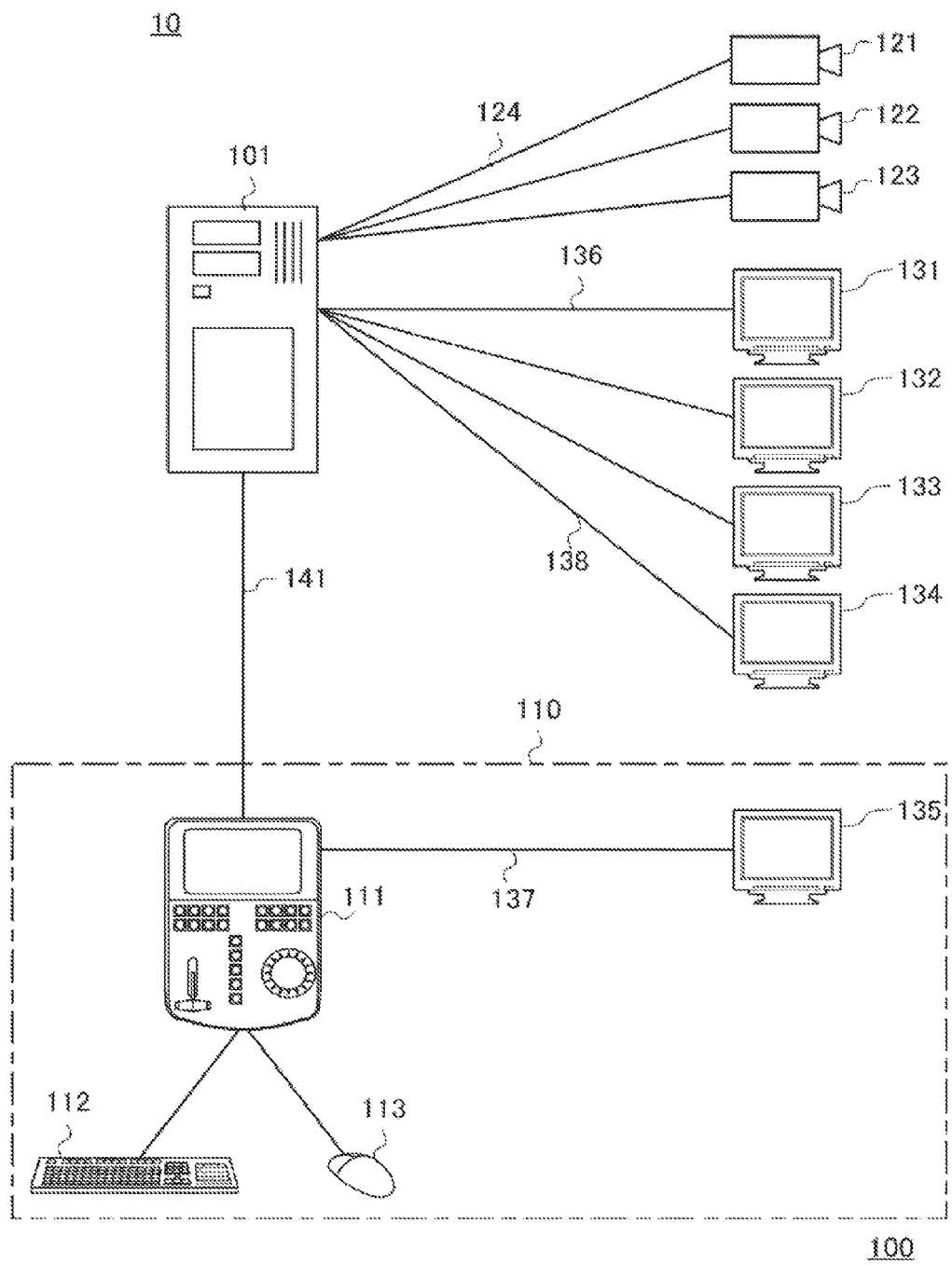
FIG. 1 is a schematic block diagram showing an overview of an information processing system including an embodiment of a pointer controlling apparatus according to the present invention.
Figure 2:
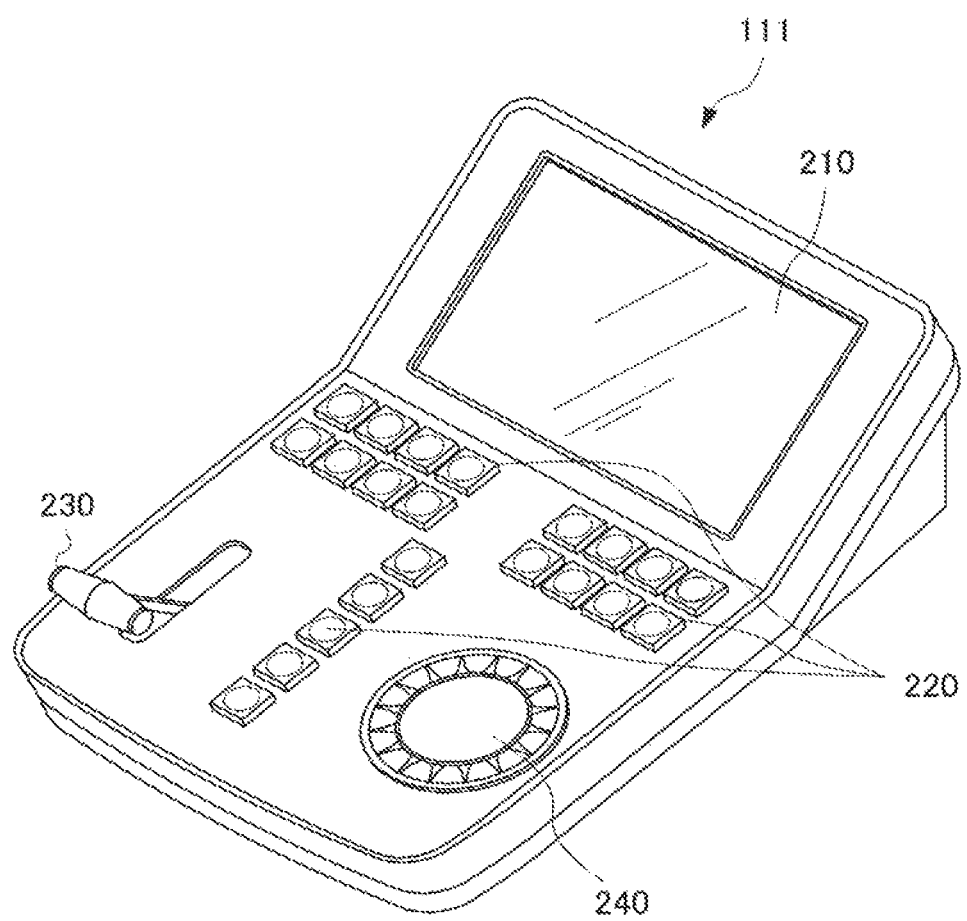
FIG. 2 is a perspective view of a controller forming the information processing shown in FIG. 1.
Figure 3:
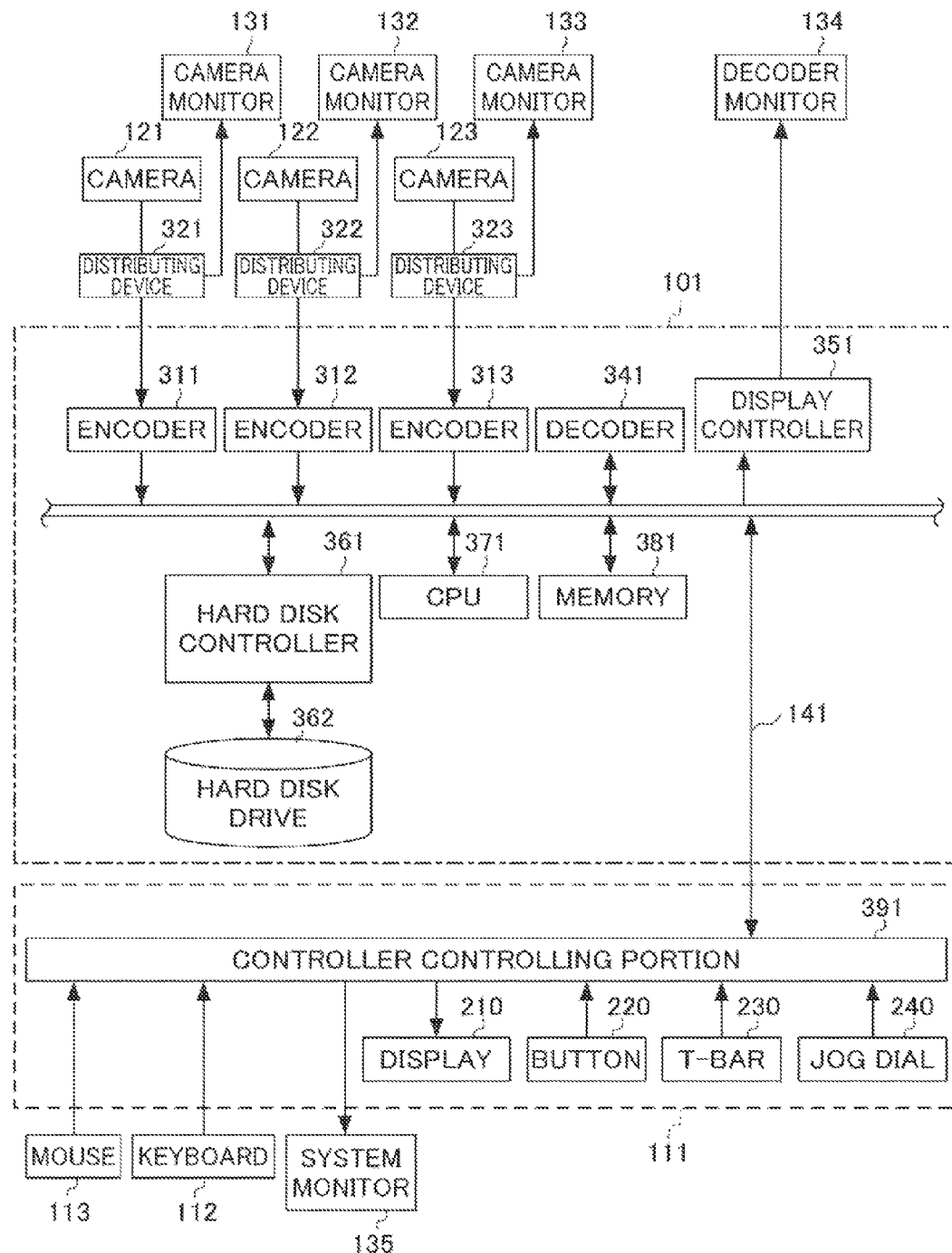
FIG. 3 is a block diagram showing the information processing system shown in FIG. 1.
Figure 4:
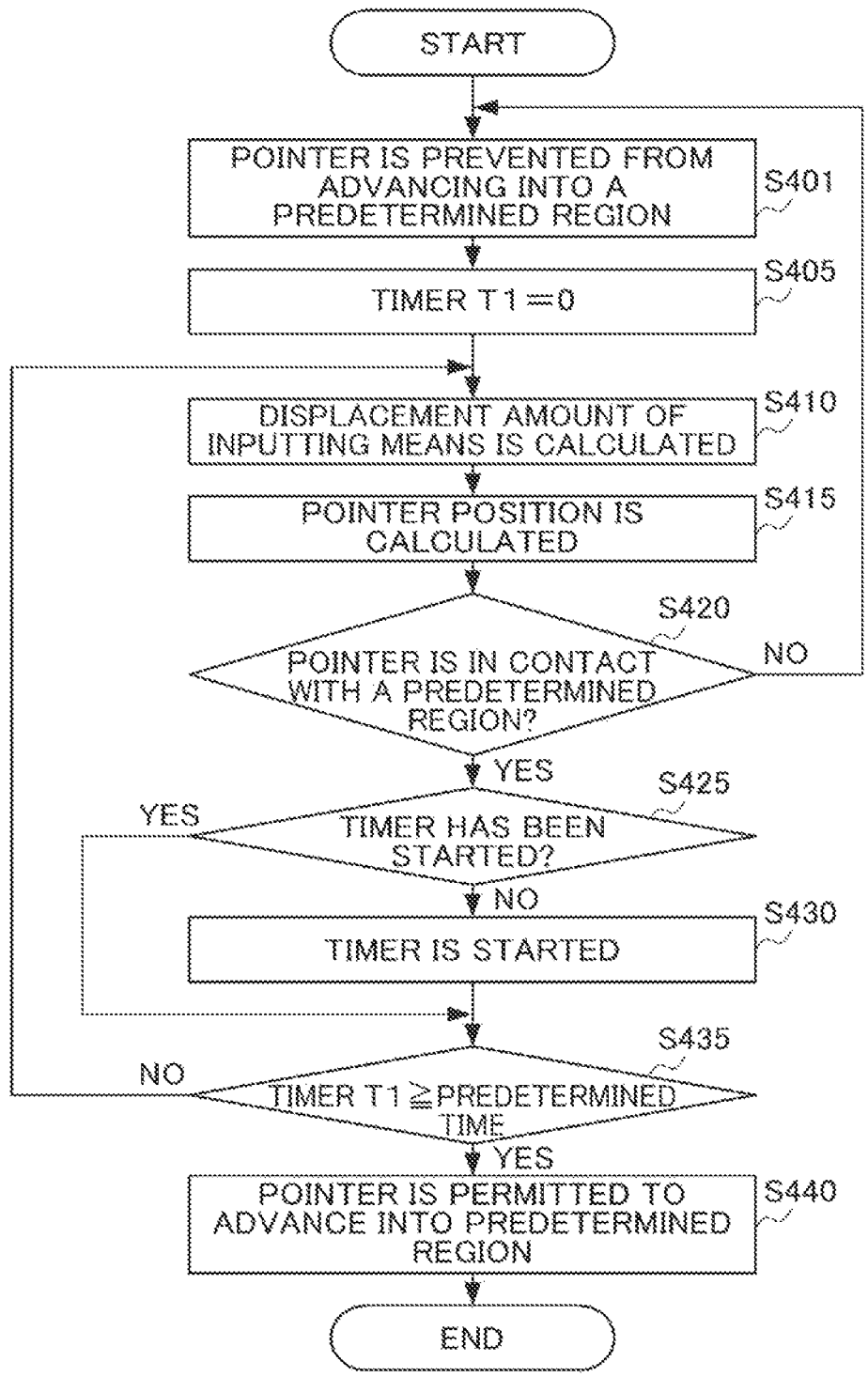
FIG. 4 is a flowchart illustrating an example of pointer control processing executed by the pointer controlling apparatus shown in FIG. 1.
Figure 5:
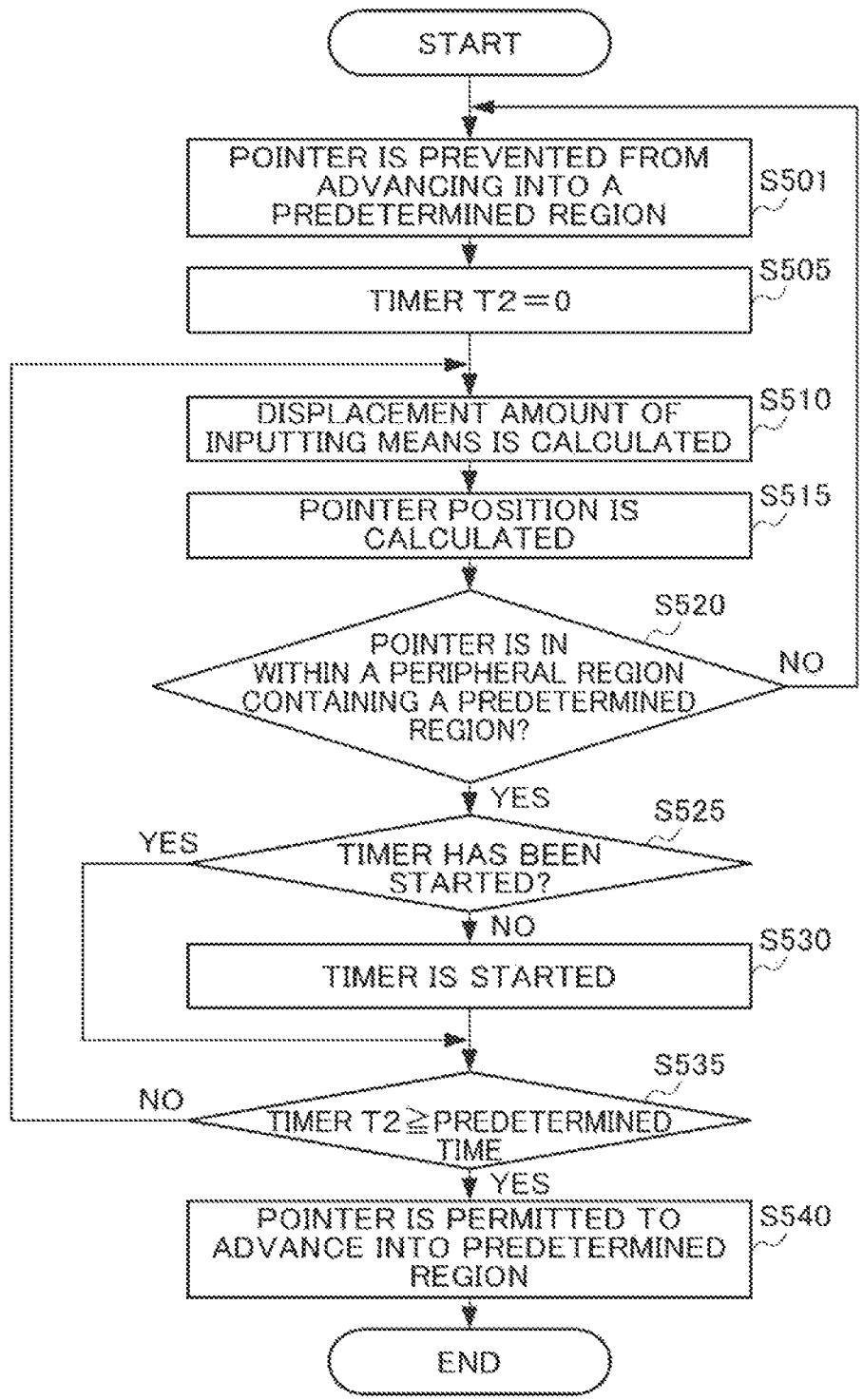
FIG. 5 is a flowchart illustrating another example of pointer control processing executed by the pointer controlling apparatus shown in FIG. 1.
Figure 6:
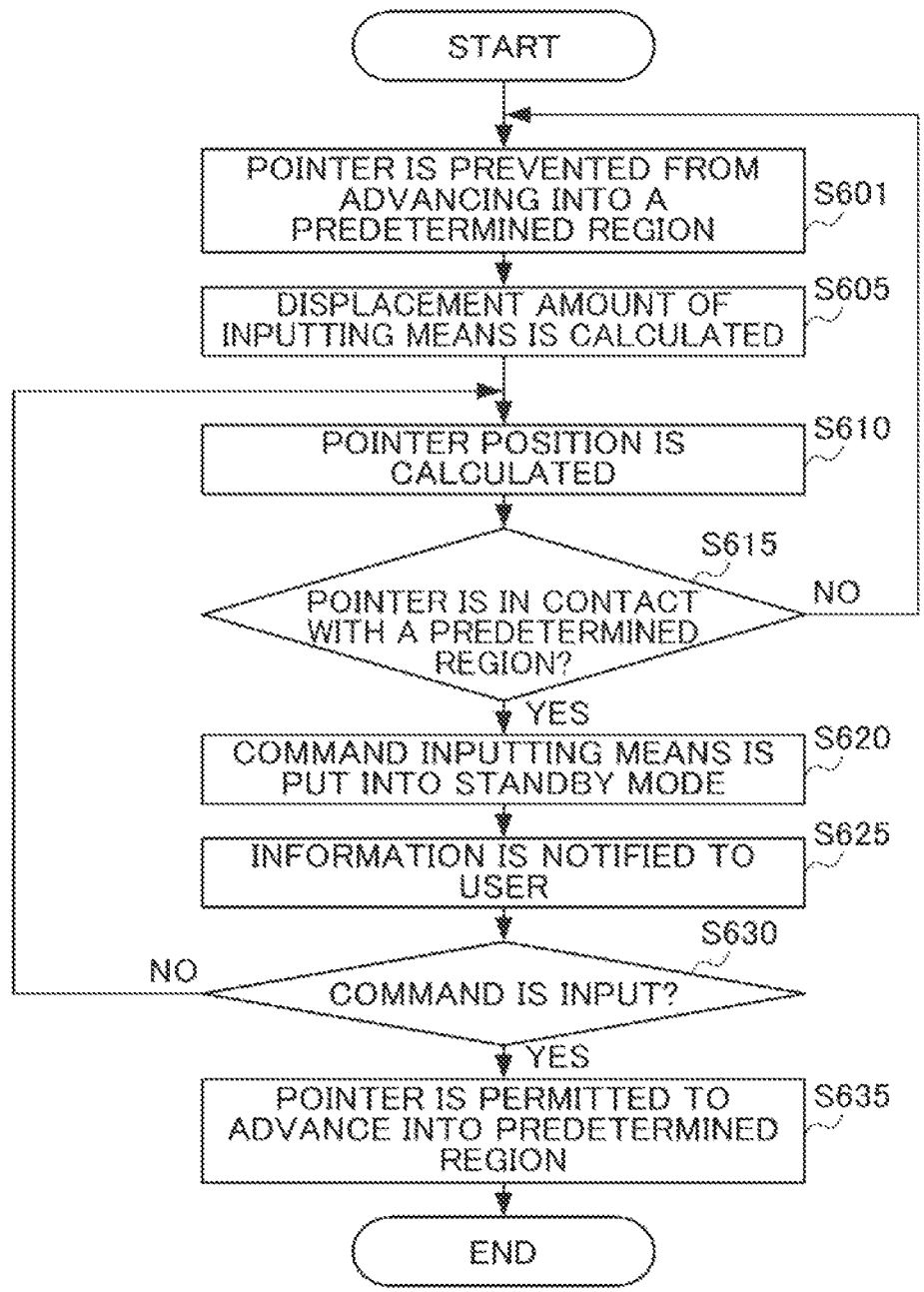
FIG. 6 is a flowchart illustrating another example of pointer control processing executed by the pointer controlling apparatus shown in FIG. 1.
Figure 7:
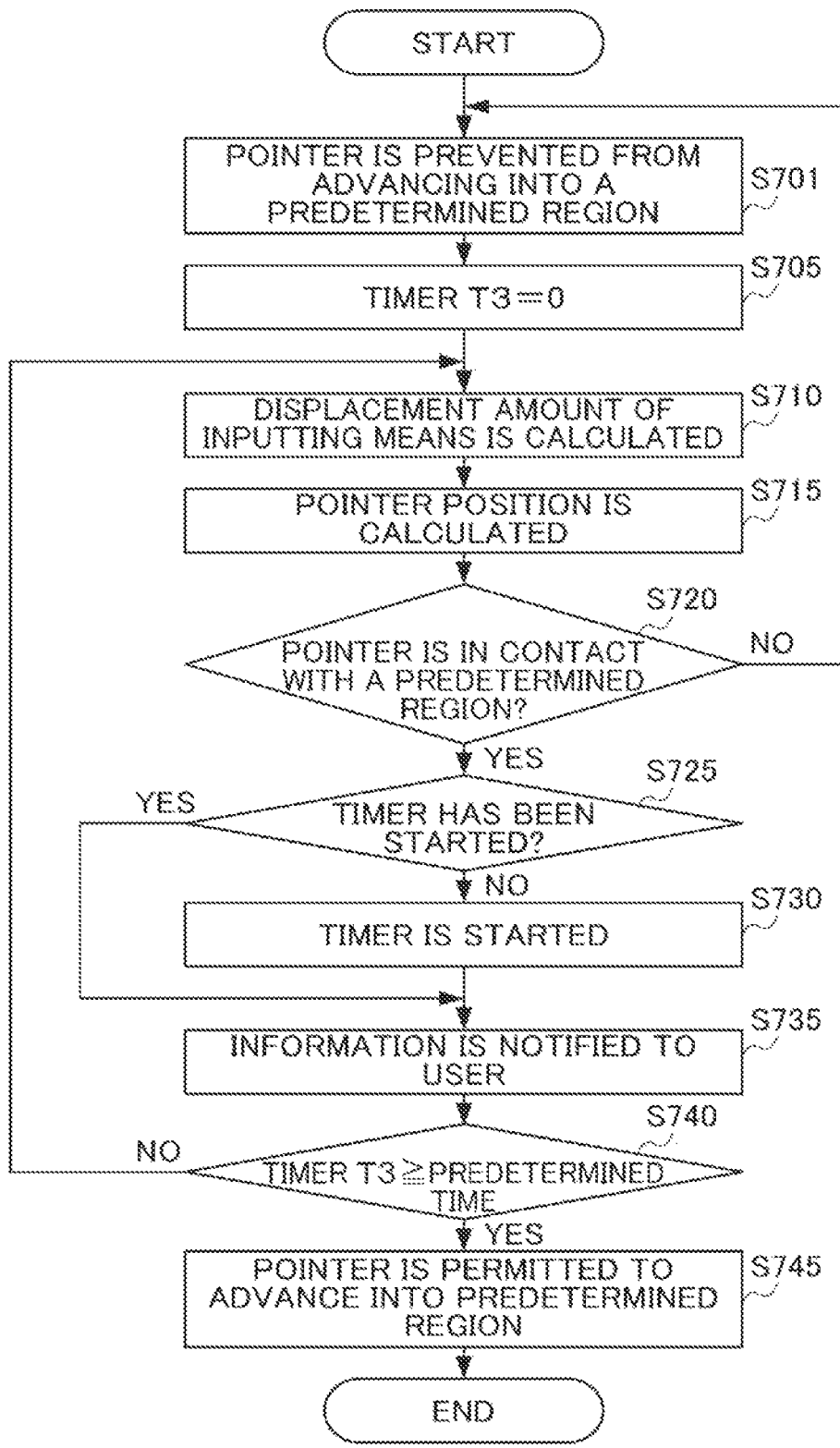
FIG. 7 is a flowchart illustrating an example of pointer control processing executed by the pointer controlling apparatus shown in FIG. 1.
Figure 9A:
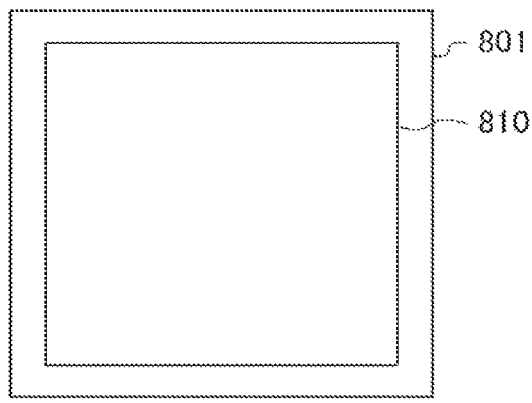
FIG. 9A is a view of an example of a button in the screen display shown in FIG. 8.
Figure 9B:
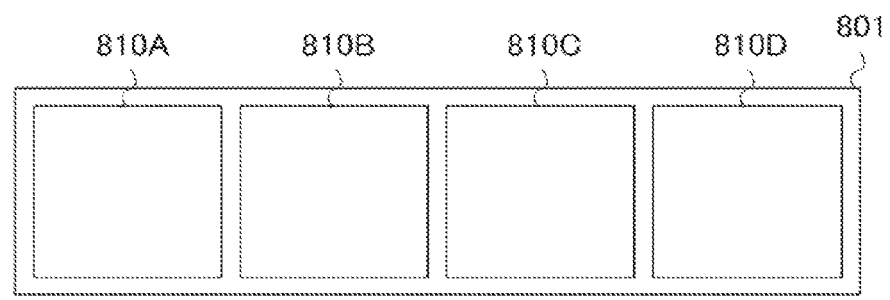
FIG. 9B is a view of another example of a button in the screen display shown in FIG. 8.
Figure 9C:
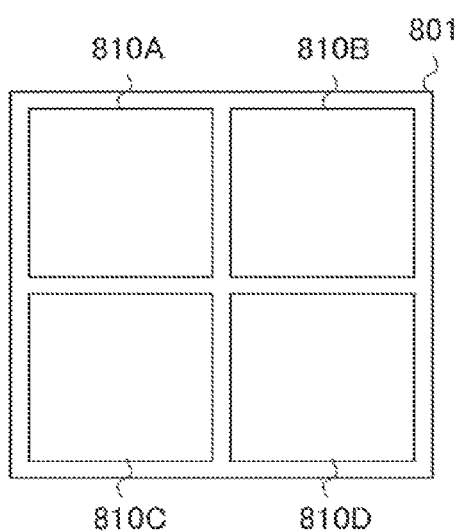
FIG. 9C is a view of another example of a button in the screen display shown in FIG. 8.
Figure 11A:
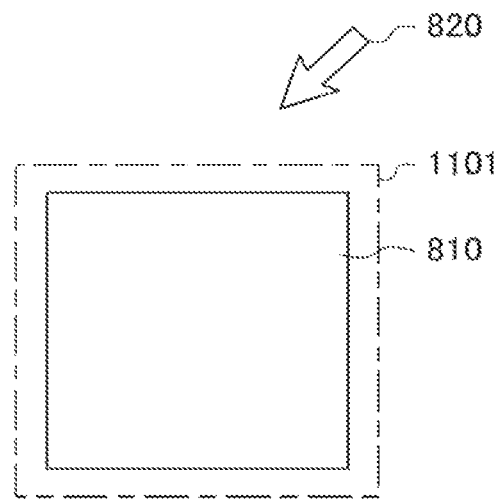
FIG. 11A is a view of examples of a pointer and a pointer detection region in the screen display shown in FIG. 8.
Figure 11B:
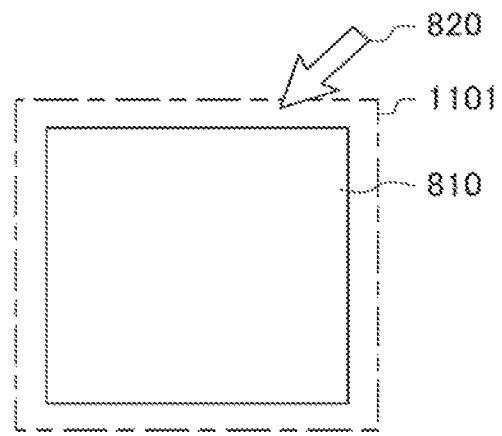
FIG. 11B is a view similar to FIG. 11A showing that the pointer advanced in the pointer detection region.
Figure 11C:
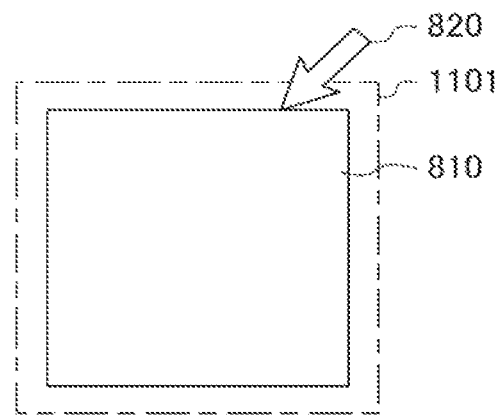
FIG. 11C is a view similar to FIG. 11A showing that the pointer comes into contact with the button.
Figure 13B:
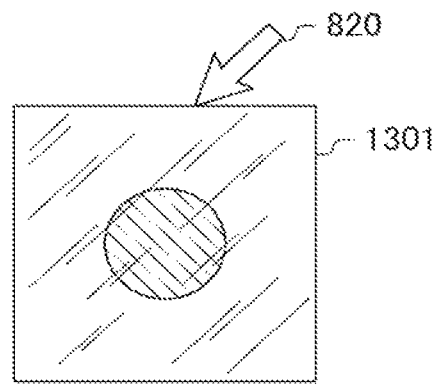
FIG. 13B is a view similar to FIG. 13A showing that the pointer comes into contact with the button.
Figure 13C:
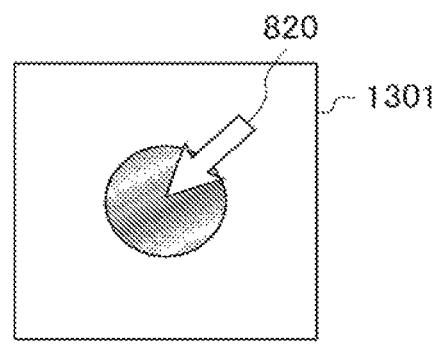
FIG. 13C is a view similar to FIG. 13A showing that the pointer advanced into the button.
Figure 14:
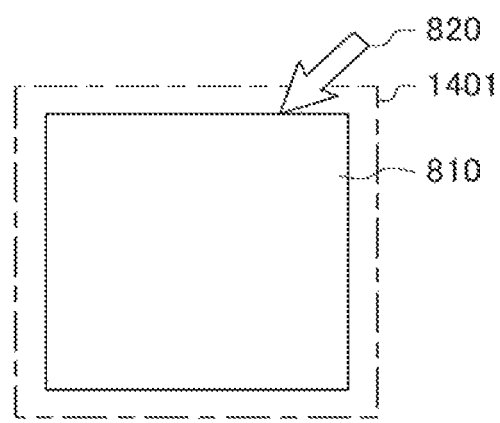
FIG. 14 is a view of examples of a pointer, a button, and contact maintaining region in the screen display shown in FIG. 8.
Figure 17B:
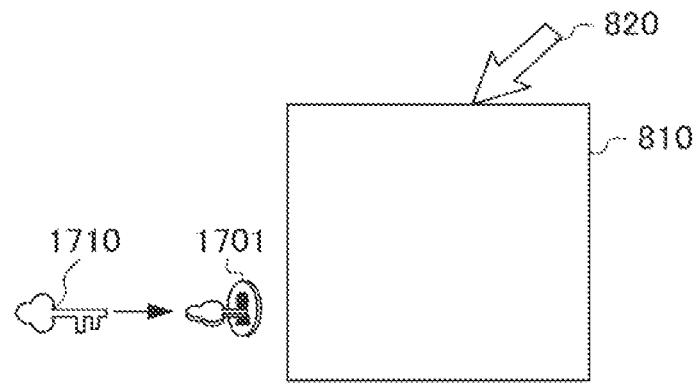
FIG. 17B is a view similar to FIG. 17A showing that a button protection time has elapsed.
Figure 18A:
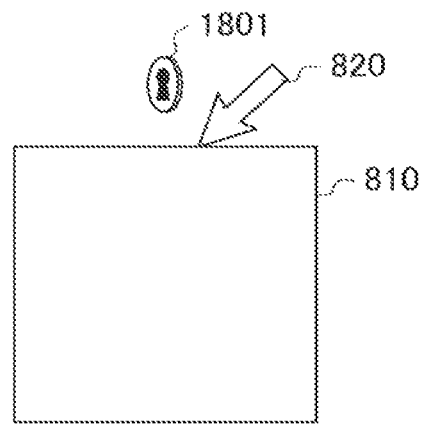
FIG. 18A is a view of examples of a pointer, a button, and a notification icon in the screen display shown in FIG. 8.
Figure 18B:
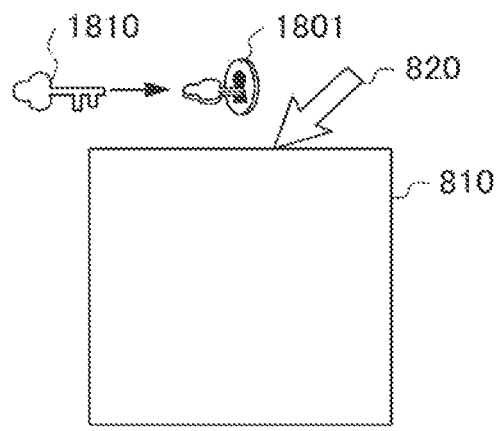
FIG. 18B is a view similar to FIG. 18A showing that a button protection time has elapsed.
Figure 19A:
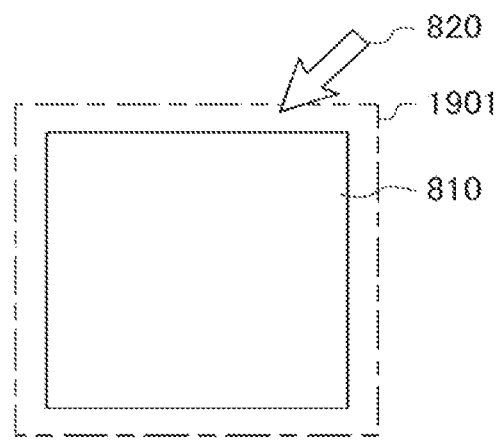
FIG. 19A is a view of examples of a pointer, a button, and a contact force region in the screen display shown in FIG. 8.
Figure 19B:
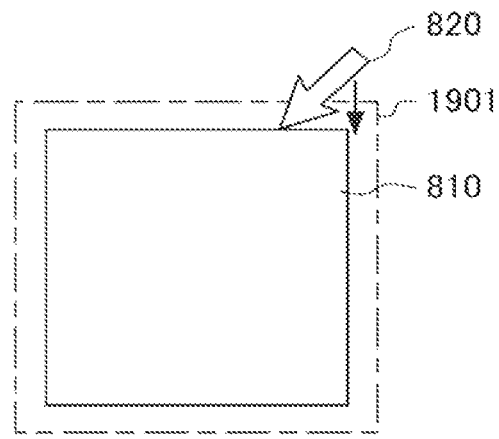
FIG. 19B is a view similar to FIG. 18A showing that the pointer forcibly comes into contact with the button.
Figure 20:
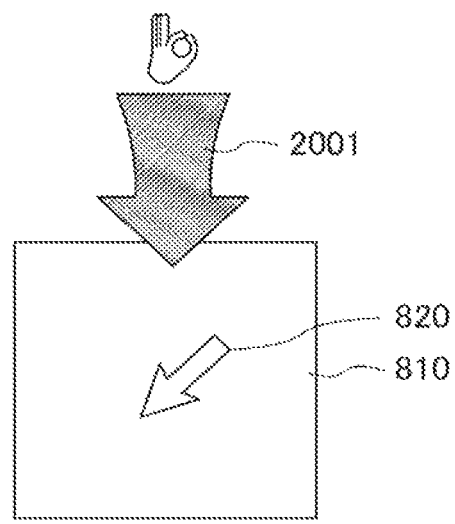
FIG. 20 is a view of examples of a pointer, a button, and a notification icon in the screen display shown in FIG. 8.

100 information processing system
101 image server
111 controller
112 keyboard
113 mouse
135 system monitor
210 display
391 controller controlling portion

The invention claimed is:

1. A pointer controlling apparatus, comprising:
controlling means for preventing a pointer from moving into a predetermined region of a button having a control function when the pointer attempts to move into the predetermined region until a command is received;
notification means for providing a notification to a user, in response to the pointer coming into contact with the predetermined region, that the pointer has come into contact with the predetermined region; and
command receiving means for receiving the command from a user in response to the notification, wherein the pointer is prohibited from advancing into the predetermined region and the button is maintained in a state in which it is protected from input operation until the command is received from the user in response to the notification, wherein the controlling means permits the pointer to move into the predetermined region and to operate a control function associated with the predetermined region, in accordance with the command received by the command receiving means.

2. The pointer controlling apparatus of claim 1, wherein the controlling means controls the pointer so that it crosses over the predetermined region without stopping at a side of the predetermined region when the pointer comes into contact with the predetermined region at a speed above a predetermined movement speed.

3. The pointer controlling apparatus of claim 1, wherein the controlling means protects the control function associated with the predetermined region from being operated when the pointer comes into contact with the predetermined region at a speed above a predetermined movement speed.

4. The pointer controlling apparatus of claim 1,
wherein the controlling means stops providing the notification to the user when the pointer leaves the predetermined region before the command is received after having come into contact with the boundary line of the predetermined region.

5. The pointer controlling apparatus of claim 1,
wherein a display of the pointer changes from the point in time when the pointer comes into contact with the boundary line of the predetermined region until the command is received.

6. The pointer controlling apparatus of claim 1, wherein a display of the predetermined region changes from the point in time when the pointer comes into contact with the boundary line of the predetermined region until the command is received.

7. The pointer controlling apparatus of claim 1, wherein the notification means is further configured to display an image indicating that the pointer is prohibited from moving into the predetermined region or an image indicating that the pointer is permitted to advance into the predetermined region when the pointer comes into contact with the predetermined region.

8. The pointer controlling apparatus of claim 1, wherein the predetermined region is a region for one of activating and deactivating a function of a predetermined program.

9. The pointer controlling apparatus of claim 1, wherein the pointer is moved to a position of contact with the predetermined region when the pointer has advanced into a region located outside the predetermined region and is separated by a predetermined distance from the predetermined region.

10. The pointer controlling apparatus of claim 1, wherein a display of the pointer changes after the pointer comes into contact with the predetermined region in correspondence to one of the prohibition of the pointer to move and the permission of the pointer to move to the predetermined region.

11. The pointer controlling apparatus of claim 1, wherein a display of the predetermined region changes after the pointer comes into contact with the predetermined region in correspondence to one of the prohibition of the pointer to move and the permission of the pointer to move to the predetermined region.

12. The pointer controlling apparatus of claim 1, wherein the command receiving means comprises at least one of a keyboard, a mouse, and a touch panel.

13. The pointer controlling apparatus of claim 1, wherein the notification means is further configured to provide a notification to the user when the controlling means permits the pointer to move into the predetermined region.

14. A pointer controlling method, comprising:
preventing a pointer from moving into a predetermined region when the pointer attempts to move into the predetermined region of a button having a control function at a speed below a predetermined movement speed until a command is received;
providing a notification to a user, in response to the pointer coming into contact with the predetermined region, that the pointer has come into contact with the predetermined region; and
receiving the command from a user in response to the notification, wherein the pointer is prohibited from advancing into the predetermined region and the button is maintained in a state in which it is protected from input operation until the command is received from the user in response to the notification; and
permitting the pointer to move into the predetermined region and to operate a control function associated with the predetermined region, in accordance with the received command.

15. The method of claim 14, further comprising:
controlling the pointer so that it crosses over the predetermined region without stopping at a side of the predetermined region when the pointer comes into contact with the predetermined region at a speed above the predetermined movement speed.

16. A non-transitory computer-readable medium storing computer-executable code to:
prevent a pointer from moving into a predetermined region when the pointer comes into contact with the predetermined region of a button having a control function at a speed below a predetermined movement speed until a command is received;
provide a notification to a user, in response to the pointer coming into contact with the predetermined region, that the pointer has come into contact with the predetermined region; and
receive the command from the user in response to the notification, wherein the pointer is prohibited from advancing into the predetermined region and the button is maintained in a state in which it is protected from input operation until the command is received from the user in response to the notification; and
permit the pointer to move into the predetermined region and to operate a control function associated with the predetermined region after receiving the command from the user.

17. The computer-readable medium of claim 16, further comprising code to:
control the pointer so that it crosses over the predetermined region without stopping at a side of the predetermined region when the pointer comes into contact with the predetermined region at a speed above the predetermined movement speed.

18. The computer-readable medium of claim 16, further comprising code to:
control the pointer so that it protects the control function associated with the predetermined region from being operated when the pointer comes into contact with the predetermined region at a speed above the predetermined movement speed.

19. The computer-readable medium of claim 16, further comprising code to:

change a display of at least one of the pointer and the predetermined region from the point in time when the pointer comes into contact with the boundary line of the predetermined region until the command is received.

20. The computer-readable medium of claim 16, further comprising code to:
display an image indicating that the pointer is prohibited from moving into the predetermined region or an image indicating that the pointer is permitted to advance into the predetermined region after the pointer has come into contact with the predetermined region.

21. The computer-readable medium of claim 16, further comprising code to:
stop the notification to the user when the pointer leaves the predetermined region before the command is received after having come into contact with the boundary line of the predetermined region.

22. The computer-readable medium of claim 16, further comprising code to:
change a display of the predetermined region from the point in time when the pointer comes into contact with the boundary line of the predetermined region until the command is received.

23. The computer-readable medium of claim 16, wherein the predetermined region is a region for one of activating and deactivating a function of a predetermined program.

24. The computer-readable medium of claim 16, wherein the pointer is moved to a position of contact with the predetermined region when the pointer has advanced into a region located outside the predetermined region and is separated by a predetermined distance from the predetermined region.

25. The computer-readable medium of claim 16, further comprising code to:
change a display of the pointer after the pointer comes into contact with the predetermined region in correspondence to one of the prohibition of the pointer to move and the permission of the pointer to move to the predetermined region.

26. The computer-readable medium of claim 16, further comprising code to:
change a display of the predetermined region after the pointer comes into contact with the predetermined region in correspondence to one of the prohibition of the pointer to move and the permission of the pointer to move to the predetermined region.

27. The computer-readable medium of claim 16, further comprising code to:
provide a notification to the user when the pointer is permitted to move into the predetermined region.

28. The method of claim 14, further comprising:
protecting the control function associated with the predetermined region from being operated when the pointer comes into contact with the predetermined region at a speed above a predetermined movement speed.

29. The method of claim 14, further comprising:
stopping providing the notification to the user when the pointer leaves the predetermined region before the command is received after having come into contact with the boundary line of the predetermined region.

30. The method of claim 14, further comprising:
changing a display of the pointer from the point in time when the pointer comes into contact with the boundary line of the predetermined region until the command is received.

31. The method of claim 14, further comprising:
changing a display of the predetermined region from the point in time when the pointer comes into contact with the boundary line of the predetermined region until the command is received.

32. The method of claim 14, further comprising:
displaying an image indicating that the pointer is prohibited from moving into the predetermined region or an image indicating that the pointer is permitted to advance into the predetermined region when the pointer comes into contact with the predetermined region.

33. The method of claim 14, wherein the predetermined region is a region for one of activating and deactivating a function of a predetermined program.

34. The method of claim 14, wherein the pointer is moved to a position of contact with the predetermined region when the pointer has advanced into a region located outside the predetermined region and is separated by a predetermined distance from the predetermined region.

35. The method of claim 14, further comprising:
changing a display of the pointer after the pointer comes into contact with the predetermined region in correspondence to one of the prohibition of the pointer to move and the permission of the pointer to move to the predetermined region.

36. The method of claim 14, further comprising:
changing a display of the predetermined region after the pointer comes into contact with the predetermined region in correspondence to one of the prohibition of the pointer to move and the permission of the pointer to move to the predetermined region.

37. The method of claim 14, further comprising:
providing a notification to the user when the pointer is permitted to move into the predetermined region.

* * * * *